US012808449B2

(12) United States Patent
Starzmann et al.

(10) Patent No.: US 12,808,449 B2
(45) Date of Patent: Nov. 24, 2026

(54) VALVE ARRANGEMENT

(71) Applicant: Festo SE & Co. KG, Esslingen (DE)

(72) Inventors: Ralf Starzmann, Reichenbach (DE); Peter Rühle, Weinstadt-Schnait (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/984,371

(22) Filed: Dec. 17, 2024

(65) Prior Publication Data

US 2025/0207678 A1 Jun. 26, 2025

(30) Foreign Application Priority Data

Dec. 21, 2023 (DE) ......................... 102023136292.5

(51) Int. Cl.

*F16K 27/00* (2006.01)
*F16K 27/02* (2006.01)
*F16K 31/40* (2006.01)

(52) U.S. Cl.

CPC ........ *F16K 27/003* (2013.01); *F16K 27/0263* (2013.01); *F16K 31/40* (2013.01)

(58) Field of Classification Search

CPC .... F16K 27/003; F16K 27/0263; F16K 31/40; F16K 11/10; F16K 49/00; F15B 13/02

See application file for complete search history.

(56) References Cited

U.S. PATENT DOCUMENTS

2009/0126812 A1 5/2009 Bogdanowicz

FOREIGN PATENT DOCUMENTS

| | | | | |
|---|---|---|---|---|
| DE | 89 04 127 U | 5/1989 | | |
| DE | 10 2007 055 460 A | 5/2009 | | |
| EP | 2 047 111 B | 4/2011 | | |
| EP | 3296602 A1 * | 3/2018 | ........... | F16K 27/003 |

OTHER PUBLICATIONS

Office Action issued in corresponding German Patent Application No. 10 2023 136 292.5, Aug. 26, 2024, 4 pages.

* cited by examiner

*Primary Examiner* — Kelsey E Cary
(74) *Attorney, Agent, or Firm* — HSML P.C.

(57) ABSTRACT

A valve arrangement containing a valve assembly, such valve assembly having a valve support, such valve support having valve mounting points which are mounted with electrically actuable directional valves. A plurality of valve support fluid channels are designed in the valve support, which at least in part open out at each valve mounting point and are fluidically connected to each directional valve. A communication channel is also designed in the valve support, in which a communication string having at least one electronic component is arranged, with which the mounted directional valves make electrical contact to enable their electrical control. At least one collecting fluid channel also opens out at a cooling module mounting point of the valve support, on which a cooling module is mounted. The cooling module is penetrated by a cooling channel structure, which provides a fluidic connection between the collecting fluid channel and the communication channel.

26 Claims, 9 Drawing Sheets

VALVE ARRANGEMENT

CROSS-REFERENCE TO RELATED APPLICATION

This application claims the benefit of German application DE 10 2023 136 292.5 filed Dec. 21, 2023, which is incorporated herein by reference.

The invention relates to a valve arrangement, having a valve assembly, which has a valve support extending in a principle direction along a main axis and a plurality of electrically actuable directional valves, wherein the valve support has a mounting surface with a plurality of mounting points arranged successively in the principle direction, of which at least a plurality are designed as valve mounting points, on each of which one of the directional valves can be or is mounted, wherein a plurality of valve support fluid channels, through which a fluidic pressure medium can flow, are designed in the valve support, which are at least in part collecting fluid channels extending in the principle direction, which open out at each valve mounting point and which are fluidly connected to the directional valves mounted on the valve mounting points, and wherein a communication channel is designed in the valve support extending in the principle direction, in which an electrical communication string is arranged, having at least one electronic component and is or can be connected to a electronic control device, with which the mounted directional valves in the area of the valve mounting point allocated to each of them have an electrical contact.

EP 2 047 111 B1 discloses a valve arrangement of this type, having a valve assembly described as a valve battery, which has a plate-shaped valve support, which is mounted with a plurality of electrically actuable directional valves, described as valve units. The directional valves are mounted on valve mounting points of the valve support and are provided for the actuation of connected fluid-operated drives through the controlled feed and discharge of a fluidic pressure medium. In particular, the fluidic pressure medium is compressed air. In a cavity which can be described as a communication channel formed in the valve support, extends an electrical communication string described as a modular subplate, which all directional valves are in electrical contact with and which is also provided for transmitting electrical control signals supplied by an electronic control device to the directional valves when actuation is required. The fluidic pressure medium used by the directional valves when in operation is fed through valve support fluid channels designed in the valve support, which channels are partly collecting channels, which permit the collective feed and discharge of the pressure medium and which open out at all valve mounting points.

The communication string of the valve arrangement can be equipped with one or a plurality of electronic components, which, for example, enable signals to be processed decentralised and/or, in the case of field bus controls, take over the electrical signal distribution. However, certain limits are set for the configuration of the electronics, depending on the temperature, as functional impairments can occur if it becomes too hot, which could affect the operational safety of the entire valve assembly. High operating temperatures can be caused by the electronic components themselves and/or by the development of heat in electrically-actuated valve drives of the directional valves, for example, solenoid valves.

SUMMARY OF THE INVENTION

The problem underlying the invention is to take steps which reduce the risk of functional impairments in a valve assembly due to temperature.

This problem underlying the invention in connection with the aforesaid features is solved in that, at least one of the mounting points of the valve support is designed as a cooling module mounting point, on which a cooling module of the valve arrangement, penetrated by a cooling channel structure, can be or is mounted, wherein by means of the cooling channel structure of the mounted cooling module, a fluidic connection between at least one collecting fluid channel of the valve support fluid channels, opening out at the cooling module-mounting point, and the communication channel can be or is provided, through which fluidic pressure medium diverted from the collecting fluid channel can be fed into the communication channel by executing a cooling flow as a cooling medium for cooling the at least one electronic component of the electrical communication string.

In this way, the valve support is equipped with at least one mounting point, which, for differentiation purposes, is described as a cooling module mounting point, which according to the invention is suitable for mounting, in addition to the directional valves, an existing cooling module of the valve arrangement. One mounting surface of the valve support providing mounting points can only define a single or a plurality of cooling module mounting points, wherein the latter offers the possibility to equip the valve assembly at the same time with a plurality of cooling modules, if the cooling requirement increases. At least one of the valve support fluid channels designed as collecting fluid channels opens out at all mounting points and therefore also at the at least one cooling module mounting point, so that when the directional valves are in operation a fluidic pressure medium found in this collecting fluid channel can be tapped at the relevant cooling module mounting point through the cooling module mounted there. The aforesaid collecting fluid channel can, for example, be a vent channel, which is used for venting the directional valves and/or for venting the fluidic drives connected to the directional valves and, among other things, which communicates with the atmosphere or a feed channel used to supply fluid to the directional valves, which when the valve arrangement is in operation, is connected to an external pressure source which provides the fluidic pressure medium. For use through the cooling module, for example, just a single collecting channel or also a plurality of, in particular different kinds of, collecting channels can open out at the cooling module mounting point. The fluidic pressure medium tapped by the mounted cooling module from one or a plurality of collecting fluid channels is fed into the communication channel through the cooling module for cooling purposes as a cooling medium, for which purpose a fluid channel structure, described as a cooling channel structure, is designed in the cooling module, which is fed from at least one of the collecting fluid channels opening out at the cooling module mounting point and opens out into the communication channel. Therefore, the cooling module can carry out a cooling operation, which induces a cooling flow in the communication channel, which results in effective cooling of the electronic components of the electrical communication string, so that when the valve arrangement is in operation no functional impairments can be expected, even with an excessive development of heat.

Although the invention can be realised using any pressure media in gas form or liquid, it is preferably used using compressed air as a fluidic pressure medium, so that a cooled air flow results as a cooling flow, which can be led over the electronic components to be cooled without special protection measures.

Advantageous developments of the invention are derived from the subclaims.

Usefully, the cooling module has a module surface area, at which the cooling channel structure opens out and which, in the mounted state of the cooling module, faces the supporting cooling module mounting point. In this way, the required fluid connection to both the collecting channel, used as a coolant source, as well as the communication channel can be produced by directly attaching the cooling module to the valve support. It does not require the laying out of additional fluid lines. Preferably in the mounted state the cooling module is releasably fixed to the valve support, in particular by means of a screw connection.

Usefully, one collecting fluid channel, which opens out at the cooling module mounting point and is fluidly connected to the cooling channel structure of the mounted cooling module, is a vent channel, which intrinsically communicates with the atmosphere for ventilation purposes. Such a vent channel can also be described as an exhaust air channel when compressed air is used as a fluidic pressure medium.

The aforesaid vent channel can, for example, be provided to discharge the pressure medium, in other words the compressed air flowing back from a connected fluid-operated drive and which can be controlled by the directional valves. This step is taken in particular with non-piloted, directly actuated directional valves.

If the directional valves of the valve assembly are electrofluidically piloted directional valves, which is the preferred case, a collecting channel of the valve support, which for differentiation purposes is usefully described as a pilot vent channel, is used as a vent channel, from which the cooling medium is tapped. This pilot vent channel is provided irrespective of the inventive cooling function, in order to vent an electrically actuable pilot valve device of the directional valves, which can also be described as a pilot vent. In this way, in the case of electropneumatically piloted directional valves, when a vent switching operation of a pilot valve device is initiated, the waste air is fed into a pilot vent channel for use as a cooling medium.

When the valve arrangement is in use, the pilot vent channel normally communicates directly with the atmosphere via a pilot vent connection arranged on a valve support in order to discharge the used air from the pilot valve devices. If the cooling medium is tapped from the pilot vent channel, it can generally be kept, however in this case it is useful to close the pilot vent connection, so the entire used pilot air is available as a cooling medium for feeding into the communication channel. Here, the valve arrangement usefully has, for example, a closing element designed as a sealing plug, which can be or is attached to the pilot vent connection. The venting of the pilot valve devices can then take place through the communication channel with simultaneous cooling effect. Instead of closing the existing pilot vent connection, it can also be provided that no pilot vent connection is present on the valve support ex works.

In connection with the above, the cooling channel structure of the cooling module usefully has a cooling channel, which for differentiation purposes is described as a vent cooling channel, which, in the mounted state of the cooling module, on the one hand communicates with the vent channel of the valve support, which is conceived as a collecting fluid channel, and on the other hand opens into the communication channel.

Since the pressure medium incurred during a venting process is not normally transported for further use, a cooling process is recommended, which is always automatically applied when a venting process takes place, so that permanent use of the used air for cooling purposes is established. In this way, express control for initiating a cooling flow can be dispensed with. In this connection, it is useful to design the vent cooling channel as a free-flowing fluid channel purely dependent on the differential pressures of the cooling medium, which then always enables or permits a cooling flow, if a higher pressure is reached in the vent channel to which it is connected than in the communication channel. In this connection in particular, it is basically as well as generally advantageous, if a check valve is activated in the vent cooling channel, which—apart from a design-based response threshold—permits unobstructed flow in the direction of the communication channel, however prevents a counter flow of fluid into the vent channel. In this way, repercussions from any build-up of counter pressure in the communication channel or in a feed cooling channel, described further below, can be prevented.

It is furthermore advantageous if a gas-permeable filter is activated in the vent cooling channel of the cooling channel structure, which retains any impurities contained in the cooling medium and, in this way, prevents contamination of the communication channel and in particular the communication string contained within it. This design is then particularly advantageous, if, in order to made a cooling flow possible, the cooling channel structure has only the vent cooling channel or, in addition to the vent cooling channel, has a feed cooling channel, which does not communicate with the vent cooling channel and described further below.

Preferably one collecting fluid channel, which opens out at the cooling module mounting point and is fluidly connected to the cooling channel structure of the mounted cooling module, is a feed channel of the valve support, which is also provided to supply the electrically actuable directional valves with fluidic pressure medium. When the valve arrangement is in operation, this feed channel is connected to an external pressure source, which supplies the fluidic pressure medium and which in particular is a compressed air source.

In the case of the aforesaid feed channel, it can be a valve support fluid channel, which provides the directional valves with the controllable fluidic pressure medium for actuating a connected fluid-operated drive. If, however, the directional valves are of an electrofluidically and in particular electropneumatically piloted design in the manner already explained above, which each have a pilot valve device provided with a pressure medium via a particular pilot feed channel, the cooling medium for the cooling module is usefully tapped from this pilot feed channel. The pilot feed channel therefore opens out both at the valve mounting points as well as at the at least one cooling module mounting point.

Since the collecting fluid channel acting as a feed channel is, in the operational state of the valve arrangement, constantly under excess pressure and a cooling of the communication string is, however, not constantly required, a cooling channel of the cooling channel structure of the cooling module, which connects the feed channel to the communication channel and which, for differentiation purposes, is described as feed cooling channel, is usefully of an externally controlled design in view of the flow area made available. In this way, particularly energy-efficient cooling is possible, when use of pressure medium can be restricted at times when in fact a need for cooling arises. This is preferably achieved by installing a controllable shut-off valve in the route of the feed cooling channel, which in particular is a 2/2-way valve and which—particularly depending on the temperature—enables either a closing or opening of the feed cooling channel.

In a particularly simple structure with no requirement for electrical control, the shut-off valve is equipped with an actuating device using a shape memory alloy or a bimetal, which responds directly to the temperature prevailing in the communication channel. In this way, direct, temperature-controlled actuation of the shut-off valve can be realised without electrical control steps.

With a particularly advantageous alternative structure, the shut-off valve allocated to the feed cooling channel is of an electrically actuable design for control purposes. An electronic control device usefully takes over the control of the shut-off valve, which, in the operational state of the valve arrangement, the communication string is already connected to. Generation of the electrical control signals for the shut-off valve takes place usefully using a temperature sensor, designed as a constituent part of the communication string, which delivers electrical temperature signals, which can be evaluated by the electronic control device. The temperature sensor can be a standalone sensor or is integrated directly into an electronic component to be cooled. For example, in the case of at least one electronic component this is a processor, which is equipped internally for recording the temperature, so that the temperature can be queried at the critical place directly and, when required, can be reacted by activating the cooling function.

As already mentioned, the valve arrangement is usefully equipped with an electronic control device, which the communication string can be connected to or at least connected when the valve arrangement is used. The electronic control device can be integrated into the valve assembly or in this regard arranged externally. The control device offers, for example, the possibility of variably setting a temperature threshold for actuating the shut-off valve.

The above-mentioned control signals for the shut-off valve, which can be generated depending on the temperature, do not need to be generated in the electronic control device; instead, for this purpose, the electrical communication string can be equipped with the relevant individual control electronics.

It is advantageous if a gas-permeable filter is activated in the feed cooling channel of the cooling channel structure, which retains any impurities contained in the cooling medium and, in this way, prevents contamination of the communication channel and in particular the communication string contained within it. This design is then particularly advantageous, if, in order to made a cooling flow possible, the cooling channel structure has only the feed cooling channel or, in addition to the feed cooling channel, has a vent cooling channel, which does not communicate with the feed cooling channel and described further above.

In at least one cooling module, the cooling channel structure can contain solely one vent cooling channel or solely one feed cooling channel. Particularly useful is however a dual configuration with both a vent cooling channel as well as a feed cooling channel. Here, cooling can be constantly active by means of the vent cooling channel and active only when required by means of the feed cooling channel. In this way, a continuous homogeneous basic cooling can be achieved, which can be intensified intermittently with the occurrence of temperature peaks.

A preferred structure for the cooling module in connection with a dual cooling function provides a tapping unit and an intake unit attached to the tapping unit. The tapping unit is penetrated both by the vent cooling channel as well as the feed cooling channel, which on one hand opens out at a module surface area of the cooling module, such that, with the cooling module mounted, they communicate with a vent channel or a feed channel of the valve support and can tap fluidic pressure medium as a cooling medium from the valve support. The tapped pressure medium as a cooling medium is fed into the communication channel via the intake unit. The intake unit usefully contains a shut-off module with the shut-off valve, already mentioned above, and a transport module positioned between the shut-off module and the tapping unit. The vent cooling channel penetrates the transport module solely inside the intake unit and ends with a coolant outlet opening designed at the transport module. In contrast, the feed cooling channel penetrates both the transport module as well as the shut-off valve inside the intake unit, wherein it also ends with the aforesaid coolant outlet opening, so that a joint coolant outlet opening is allocated to the vent cooling channel and the feed cooling channel. Usefully, the two aforesaid cooling channels have a joint longitudinal section, which ends with the coolant outlet opening and which in the following is also described as a joint outlet channel section. Since the exit of the cooling medium is concentrated on the transport module, with an electrically actuable design, the shut-off valve can very easily make an electrical contact with the communication string via the shut-off module in order to receive the electrical control signals required for its operation.

If present, a gas-permeable filter is usefully arranged in the joint outlet channel section of the vent cooling channel and feed cooling channel, which has the joint coolant outlet opening. The filter can retain any impurities contained in the cooling medium and, in this way, prevent contamination of the communication channel and in particular the communication string contained within it.

Basically, with a cooling module equipped with an electrically actuable shut-off valve, there exists, by way of comparison, the advantage of how contact can be made in the electrically actuable directional valves with the electrical communication string and how the directional valves can receive its electrical control signals via the communication string. Usefully, the valve assembly is designed accordingly.

Usefully, each coolant module mounting point mounted with a coolant module is formed from one of the valve mounting points suitable for mounting with one of the electrically actuable directional valves. The valve support is also preferably equipped with mounting points, which are designed uniformly and which each communicate in the same way with the collecting channels of the valve support and all of which are valve mounting points, which in each case can be mounted with a directional valve. Furthermore, if needed, each mounting point can also be used as a cooling module mounting point to mount a cooling module upon rather than a directional valve. This results in high variability with the possibility of mounting the cooling module in whichever place is considered particularly favourable. Usefully, to make the electrical contact in at least one cooling module, the contact elements of the communication string, which are present as standard to make contact in the directional valves, can be used in each case, so that the contact steps can be realised extremely cost-effectively.

Equipping the mounting surface of the valve support with separate mounting points for, on the one hand, directional valves and, on the other hand, the at least one cooling module is of course readily possible, wherein the cooling module mounting point can be differentiated structurally from the valve mounting points.

For use in controlling fluid-operated drives, at least one and in particular two valve support fluid channels, designed as individual working channels, open usefully out at each valve mounting point and which are connected fluidly to the electrically actuable directional valve, which is mounted on the relevant valve mounting point. On the other hand, each working channel opens at a working opening, designed externally on the valve support, to which the fluid-operated drive to be controlled by the directional valve can be connected, in particular by means of a flexible fluid line.

If a valve mounting point is used as a cooling module mounting point, not all valve support fluid channels opening out at the valve mounting point are normally required for the cooling function. It is then useful if the cooling module has a cover section, by which, with the cooling module mounted, the valve support fluid channels which are not used for the cooling function and in particular do not communicate with the cooling channel structure are concealed. The cooling module can, for example, have a cover section, which covers and conceals the channel openings of the valve support fluid channels which are not used for cooling purposes, wherein in particular an intermediate seal is present at the same time to prevent fluid from exiting.

To shield the contained electrical constituent parts and to prevent impurities, the communication channel is usefully delimited all the way round by a channel wall designed as a constituent part of the valve support. However, so that a highly effective cooling flow with effective extraction of heat is established, at least one outlet channel is usefully designed in the valve assembly, through which the communication channel is connected to the atmosphere and through which the cooling medium, after flowing past on the communication string, can escape to the atmosphere.

The outlet channel is usefully provided with a gas-permeable filter, which prevents unwanted impurities from penetrating in from outside and which consists of, for example, a sintering material. Alternatively, a sound damper can also be attached, which brings the additional advantage in that the exiting cooling air does not generate any unwelcome noise.

In a possible design, the outlet channel can be formed in a channel wall of the valve support adjacent to the communication channel. For differentiation purposes, such an outlet channel is also described as a valve support outlet channel. In cases where the channel wall of the communication channel has correspondingly less wall strength, the module holder outlet channel can, for example, be formed from a simple, short wall aperture in the channel wall.

Particularly advantageous is an outlet channel designed in an outlet module of the valve assembly, wherein at least one of the mounting points of the valve support is designed as an outlet module mounting point, on which when adopting a use position the outlet module can be or is mounted. With the outlet module mounted on the outlet module mounting point, the outlet channel, also described as a module outlet channel for differentiation purposes, is fluidly connected to the communication channel via at least one inlet opening, so that the cooling medium, after flowing through the communication channel, can escape into the atmosphere through the outlet module at at least one outlet opening of the outlet module.

Preferably at least one inlet opening is located on the front side of one of two module projections of the outlet module, which, with the outlet module mounted on the allocated outlet module mounting point, each immerse into a wall aperture of the valve support, which opens into the communication channel.

Usefully, the outlet module mounting point mounted with an outlet module is formed from one of the valve mounting points suitable for mounting with one of the electrically actuable directional valves. Preferably any valve mounting point can be used as an outlet module mounting point.

Equipping the mounting surface of the valve support with a separate mounting point for the outlet module is of course readily possible, wherein the outlet module mounting point can be differentiated structurally from the valve mounting points.

With respect to one row of mounting points extending in the principle direction inside the valve assembly, it is advantageous if a first mounting point in the row of mounting points is mounted with a cooling module and a last mounting point in the row of mounting points with an outlet module, so that in this way the communication channel is exposed to a cooling flow over at least almost its entire length. The cooling flow can enter in the area of one channel end and exit in the area of the other channel end.

The valve support preferably has a multi-piece design, wherein it usefully has a carrier, which has the mounting surface. The carrier preferably has a plate-like shape. In one possible construction, the carrier is designed in one piece. It is particularly advantageous if the carrier has a structure which is segmented in the principle direction, wherein the carrier has a plurality of carrier segments adjoined in the principle direction with a reciprocating seal, on which at least one of the mounting points is designed in each case. The collecting channels are in this case assembled from series of perforations in the carriers.

On both its axial faces, the valve support usefully has in each case a terminating module, which closes the communication channel. At least one of the terminating modules can be equipped with an electromechanical interface unit, with which the communication string is in contact and which is provided for connecting the mentioned electronic control device.

The communication string usefully contains a circuit board arrangement mounted with the at least one electronic component to be cooled, which arrangement consists of a single circuit board or a plurality of adjoined circuit boards, which are in particular plugged together.

BRIEF DESCRIPTION OF DRAWINGS

The invention is explained in more detail below using the attached drawing, Drawings.

DETAILED DESCRIPTION OF INVENTION

Figure 1:
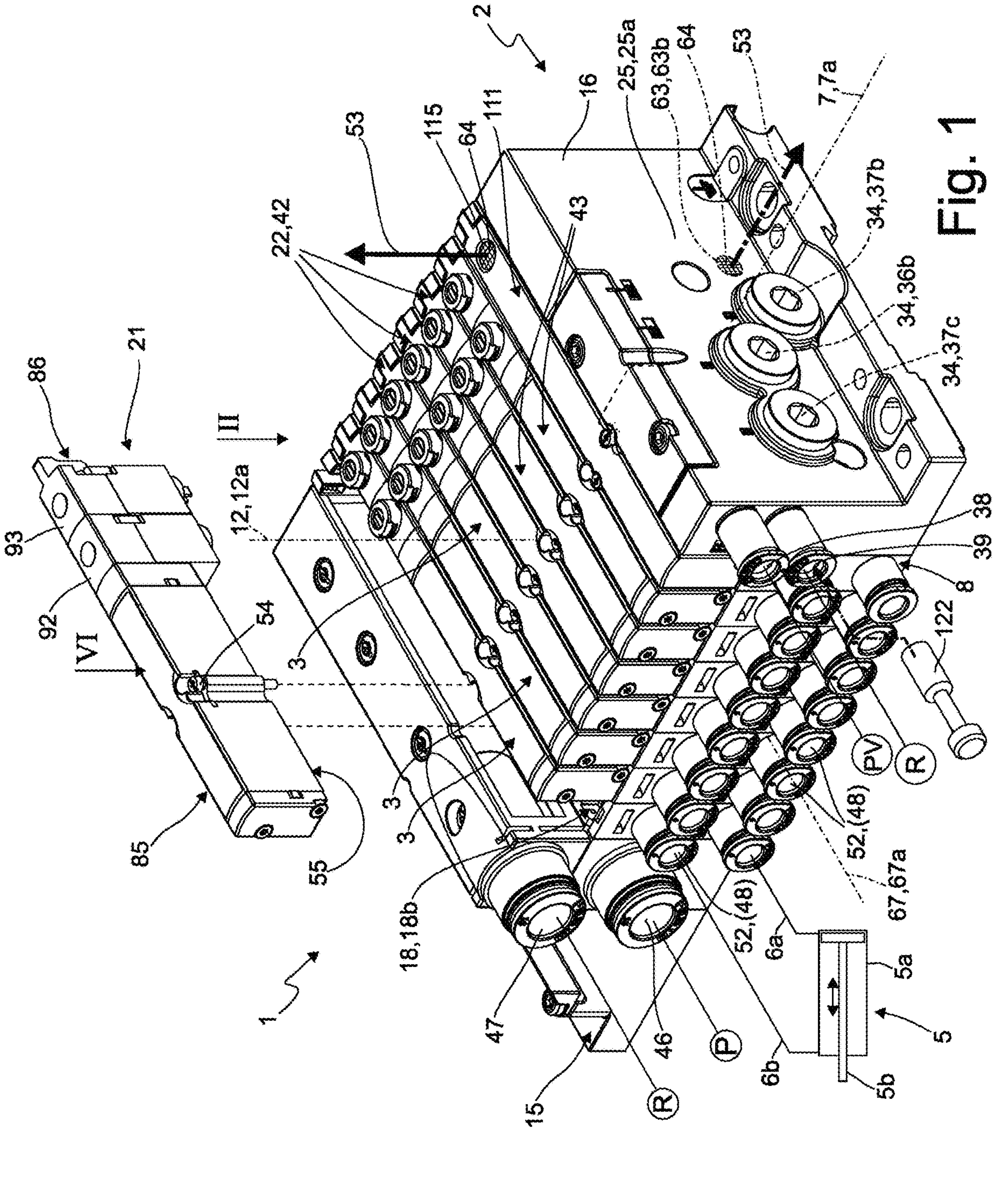
FIG. 1 shows a preferred embodiment of the inventive valve arrangement with an isometric representation of an advantageous valve assembly, which is mounted with a plurality of directional valves, with a cooling module, which is illustrated in the removed state and with an outlet module, wherein, also shown schematically, a fluid-operated drive, which is controllable by the valve arrangement, is indicated, which is connected via two fluid lines to the valve assembly and wherein an optional closing element for a pilot vent connection of the valve support is illustrated.

The described in the drawing as a whole with reference number 1 valve arrangement contains a multi-piece valve assembly 2, which has a plurality of electrically actuable directional valves 3, which for its actuation can be electrically controlled by means of a preferred electronic control device 4 likewise belonging to the valve arrangement 1. The electronic control device 4 can be integrated in the valve assembly 2, however in this respect is preferably designed separately according to the illustration, so that it can be referred to as an external electronic control device 4.

A preferred use of the valve arrangement 1 is the controlled actuation of at least one fluid-operated drive 5, wherein in one design such a fluid-operated drive 5 is shown schematically as a double-acting working cylinder in FIG. 1. The fluid-operated drive 5 has a drive housing 5*a* and a drive member 5*b* which in this respect can be moved back and forth on effecting a stroke movement indicated by a double arrow, which drive member separates two working chambers from each other in the drive housing 5*a*, which are each connected by two fluid lines 6*a*, 6*b* to the valve assembly 2. Via the two fluid lines 6*a*, 6*b*, the connected drive chambers can be either exposed to a fluidic pressure medium or vented in order to induce the stroke movement of the drive member 5*b*. The fluidic pressure medium controllable by the valve assembly 2 is preferably compressed air.

The valve assembly 2 is equipped with a plurality of electrically actuable directional valves 3, which are arranged in series in an axial direction, described as a principle direction 7*a*, of a main axis 7 of the valve assembly 2. A suitable fluid-operated drive 5 can be connected to each directional valve 3 for its controlled actuation.

The valve assembly 2 contains a preferred multi-piece valve support 8, which extends in the principle direction 7*a* and which, on a top side 11 pointing in a vertical direction 12*a* oriented vertically to the principle direction 7*a*, has a mounting surface 13, on which the directional valves 3 are preferably releasably mounted. The vertical direction 12*a* is the axial direction of a vertical axis 12 of the valve assembly 2. The mounting surface 13 lies in a plane orthogonal to the vertical axis 12.

By way of example, the mounting surface 13 is located on a carrier 14 of the valve support 8, which can be a one-piece body, but by way of example is segmented and assembled from a plurality of carrier segments 14*a*, which are juxtaposed in the principle direction 7*a* and fixed to each other by fasteners, not illustrated here.

At the front, a first terminating module 15 is connected to the carrier 14 in the area of a front side and, opposite to this, in the area of a rear side, a second terminating module 16 of the valve support 8 is connected. The terminating modules 15, 16 and the carrier 14 are usefully screwed to each other. By way of example, the first terminating module 15 is designed in two pieces and the second terminating module 16 in one piece in a manner further described below.

Figure 2:
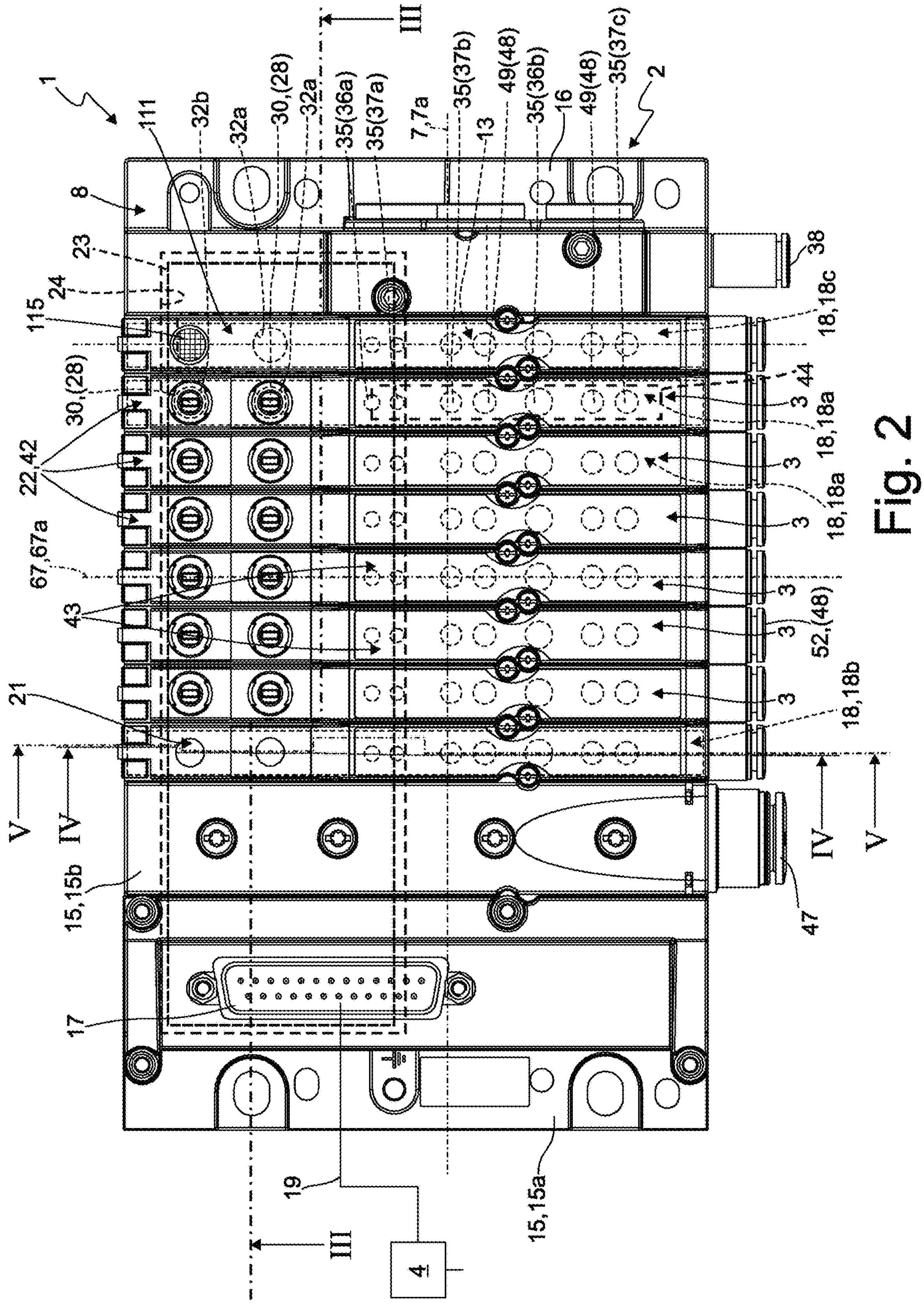
FIG. 2 shows the valve arrangement from FIG. 1 in a plan view of the valve assembly with line of sight according to arrow II from FIG. 1, wherein at the same time a usefully present electronic control device for controlling the valve assembly electrically is shown.

The first terminating module 15 has an electromechanical interface unit 17, to which the electronic control device 4 can be connected and in the operational state is electrically connected to the valve arrangement 1 according to FIG. 2 via an electrical cable arrangement 19.

The mounting surface 13 concealed in FIG. 2 by the mounted directional valves 3 is divided into a plurality of mounting surface sections arranged successively in the principle direction 7*a* and described as mounting points 18.

If the carrier 14 segmented in the described manner, exactly one mounting point 18 is usefully located on each of the carrier segments 14*a*, wherein however at least one carrier segment 14*a* can also readily have a plurality of mounting points 18.

At least a plurality of the mounting points 18 are valve mounting points 18*a*, which are designed and are suitable so a directional valve 3 can be functionally mounted on them. In the illustrated exemplary embodiment, all present mounting points 18 are used as valve mounting points 18*a* and mounted with a directional valve 3, with the exception of a first mounting point 18 following the first terminating module 15 and a last mounting point 18 in the row of mounting points 18 arranged next to the second terminating module 16.

On the first mounting point 18, which by way of example is not mounted with a directional valve 3 and is adjacent to the first terminating module 15, an operational cooling module 21 is mounted, explained in more detail below, and whose mounting possibility means that the aforesaid foremost mounting point 18 is designed as a cooling module mounting point 18*b* suitable for mounting with a cooling module 21.

On the last mounting point 18 in the row of mounting points 18, which by way of example is not mounted with a directional valve 3 and is adjacent to the second terminating module 16, an optionally present operational outlet module 111 is mounted, explained in more detail below, and whose mounting possibility means that the aforesaid last mounting point 18 is designed as an outlet module mounting point 18*c* suitable for mounting with an outlet module 111.

It is in fact preferred and by way of example so, that all mounting points 18 are designed as valve mounting points 18*a* each suitable for mounting with a directional valve 3, each of which can also be used as a cooling module mounting point 18*b* or as an outlet module mounting point 18*c*. Hence, each mounting point 18 offers the possibility to mount on it either an electrically actuable directional valve 3 or a cooling module 21 or an outlet module 111. Here it is useful if all mounting points 18 are designed identical to each other, which is the case in the illustrated exemplary embodiment. It is normally the case that the majority of the mounting points 18 are used as valve mounting points 18*a* and generally only one mounting point 18 is used as a cooling module mounting point 18*b* and only one further mounting point 18 as an outlet module mounting point 18*c*. However, if the cooling requirement increases, a plurality of mounting points 18 can also be used as cooling module mounting points 18*b* and/or as outlet module mounting points 18*c*.

Each directional valve 3 has an electrical valve drive 22, which can be controlled by means of electrical control signals, described in the following as valve control signals, in order to set a plurality of possible switching states in the directional valve 3. The valve control signals originate from the electronic control device 4 and can be conveyed to the valve drives 22 via an electrical communication string 23 of the valve assembly 2, which extends in the principle direction 7*a* inside the valve support 8. The valve support 8 contains a channel-like cavity, which is shielded from the surrounding environment and, for differentiation purposes, described as a communication channel 24.

The communication channel 24 extends in the principle direction 7*a* in the valve support 8, wherein, by way of example, it traverses the carrier 14 and is closed on a front side by the first terminating module 15 and on a rear side by the second terminating module 16. In this way, it is spatially separated from the surrounding environment by a channel wall 25 jointly formed by both terminating modules 15, 16 and the carrier 14. The communication string 23 arranged in the communication channel 24 is consequently shielded and protected from external environmental influences.

The communication string 23 has at least one electronic component 26, which can be arranged anywhere on the communication string 23. The communication string 23 can have just one single electronic component 26 or also a plurality of electronic components 26. At least one electronic component 26 is, for example, a processor or a microcomputer, which is preferably implemented by means of an electronic chip.

Preferably the communication string 23 contains a circuit board arrangement 27 extending in the principle direction 7*a*, which is mounted with the at least one electronic component 26. The circuit board arrangement 27 extends, for example, in a main extension plane orthogonal to the vertical axis 12.

For example, the communication string 23 extends into the first terminating module 15, in the area of which it makes electrical contact with the electromechanical interface unit 17. Via electrical conductors in the communication string 23, designed in particular as conductor paths, the interface unit 17 makes contact with the at least one electronic component 26 and also with a plurality of valve contact elements 28 in the communication string 23 used for making electrical contact in the directional valves 3.

Figure 3:
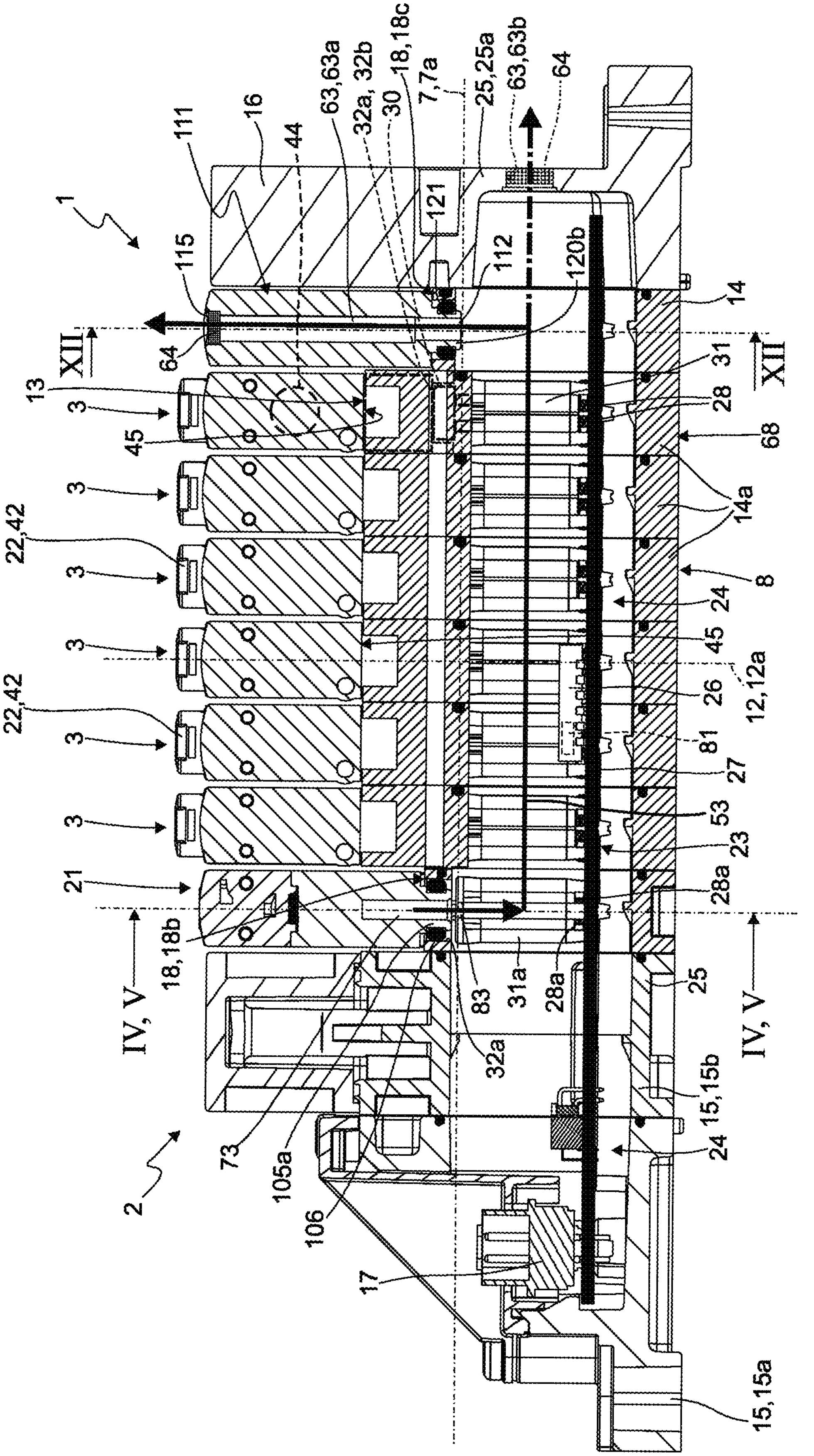
FIG. 3 shows the valve assembly from FIGS. 1 and 2 in a longitudinal section according to intersection III-III from FIGS. 2, 4 and 5, wherein a cooling flow induced by the cooling module is indicated by an arrow illustration.
Figure 4:
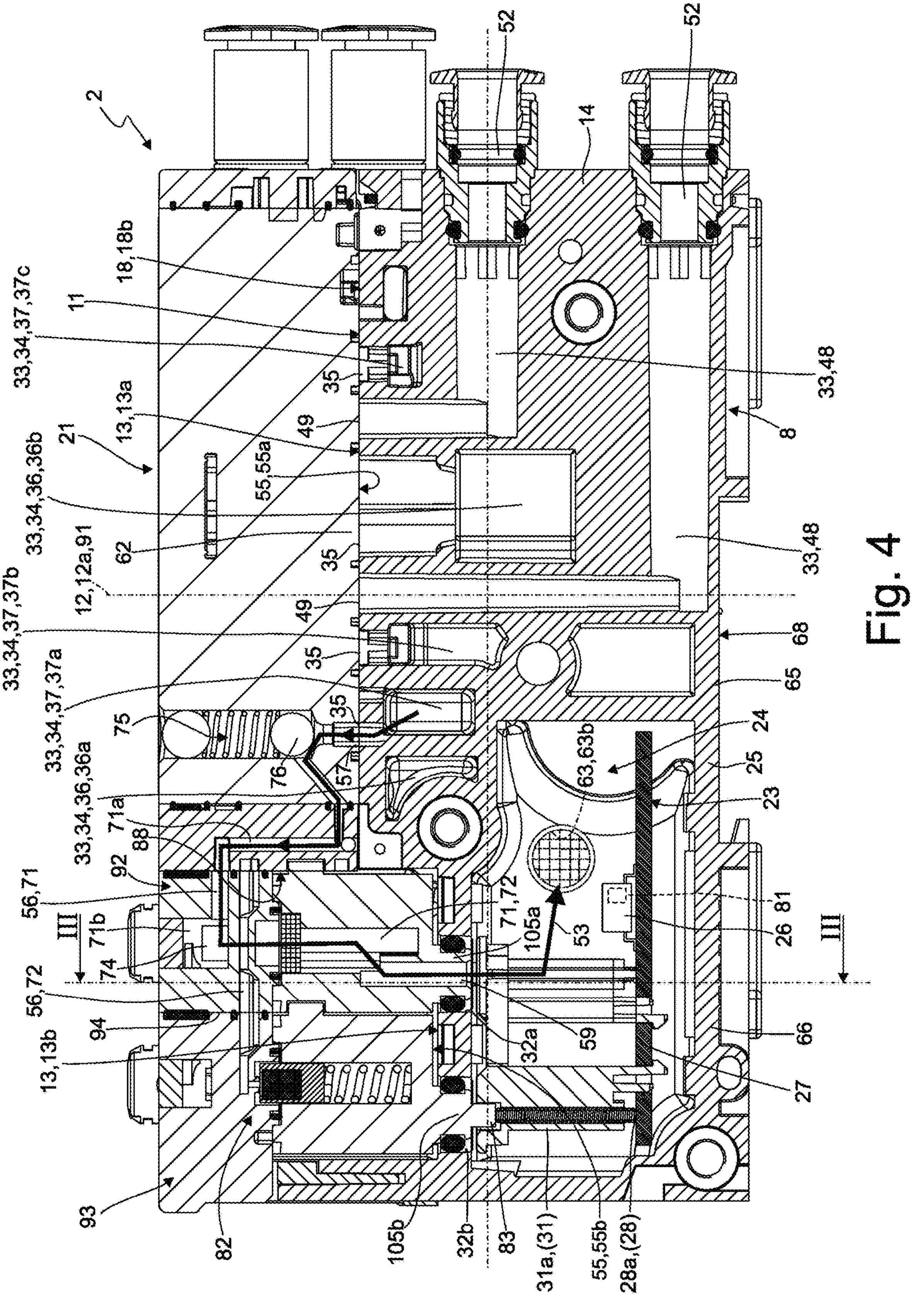
FIG. 4 shows a cross-section of the valve assembly from FIGS. 1 to 3 in the area of the mounted cooling module according to intersection IV-IV from FIG. 3, wherein a cooling flow generated by a pressure medium tapped from a pilot vent channel is indicated by an arrow illustration.
Figure 5:
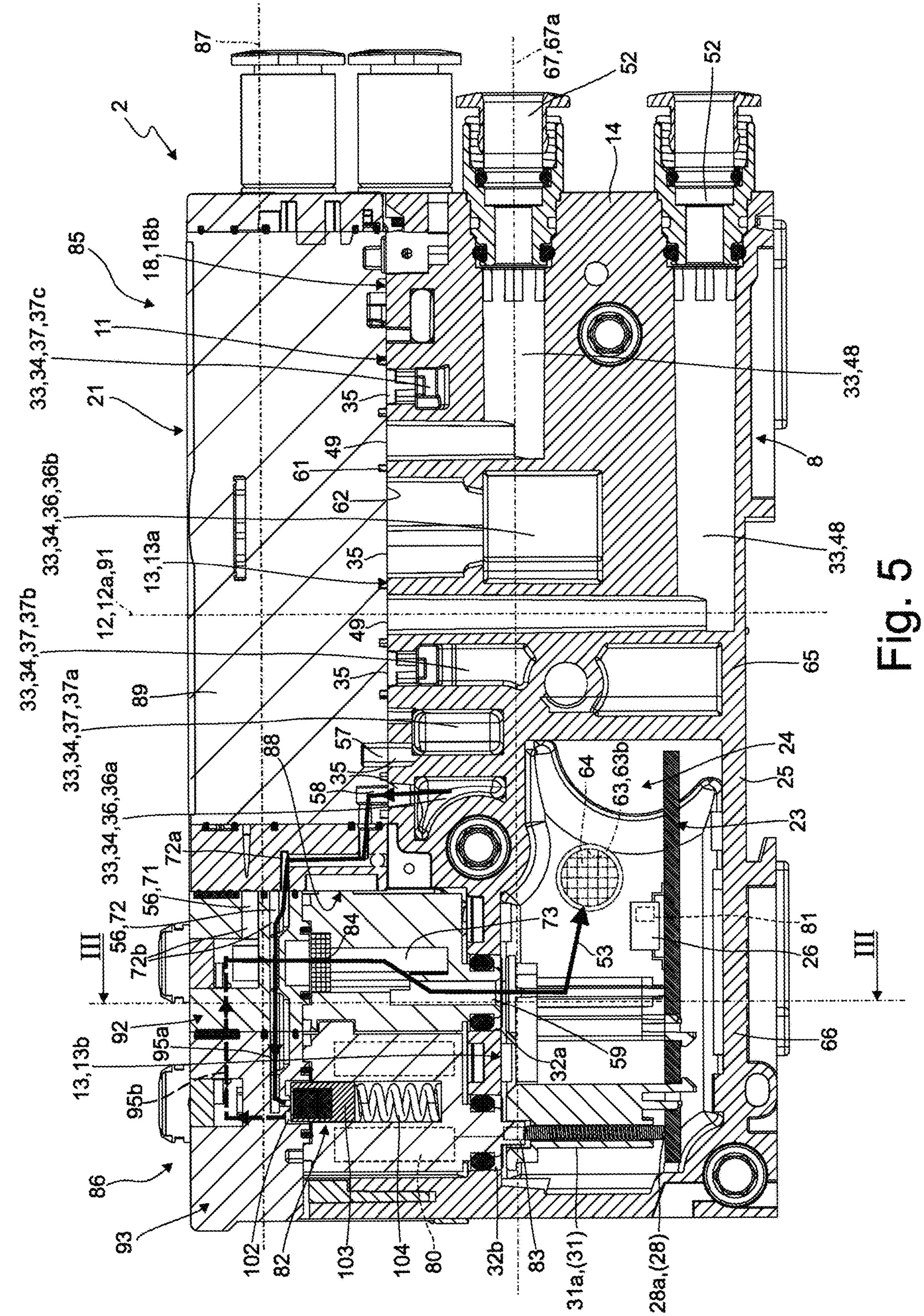
FIG. 5 shows a further longitudinal section of the valve assembly according to intersection V-V from FIG. 3, wherein a cooling flow generated by a pressure medium tapped from a pilot feed channel is indicated by an arrow illustration.
Figure 6:
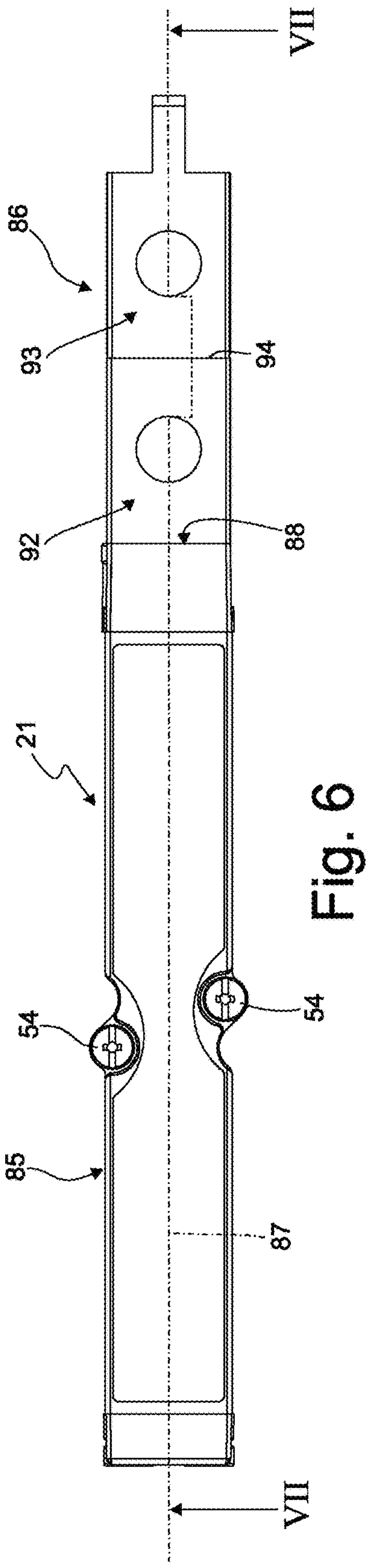
FIG. 6 shows an individual representation of a cooling module belonging to the valve assembly of FIGS. 1 to 5 in a plan view according to arrow VI-VI from FIG. 1.
Figure 7:
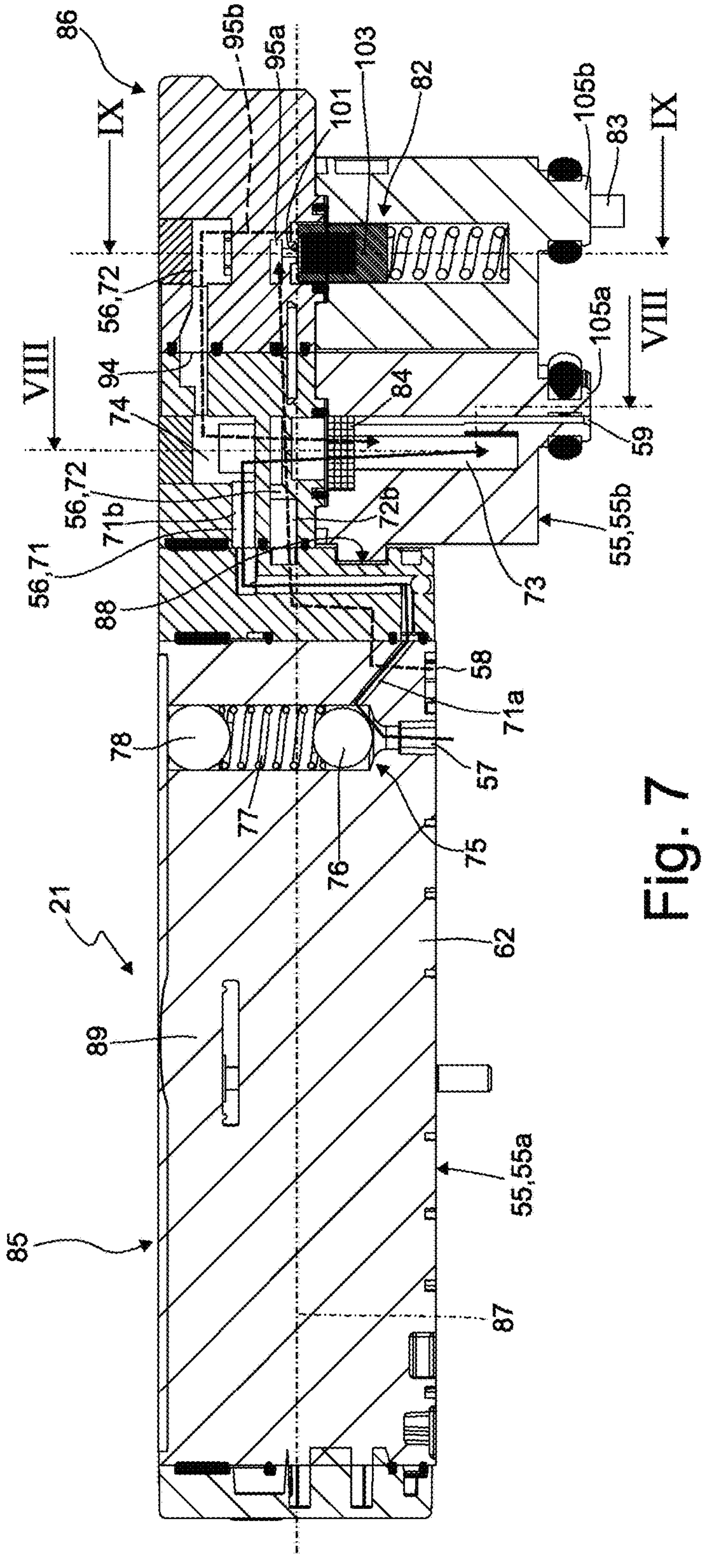
FIG. 7 shows a longitudinal section of the cooling module according to intersection VII-VII from FIG. 6.
Figure 9:
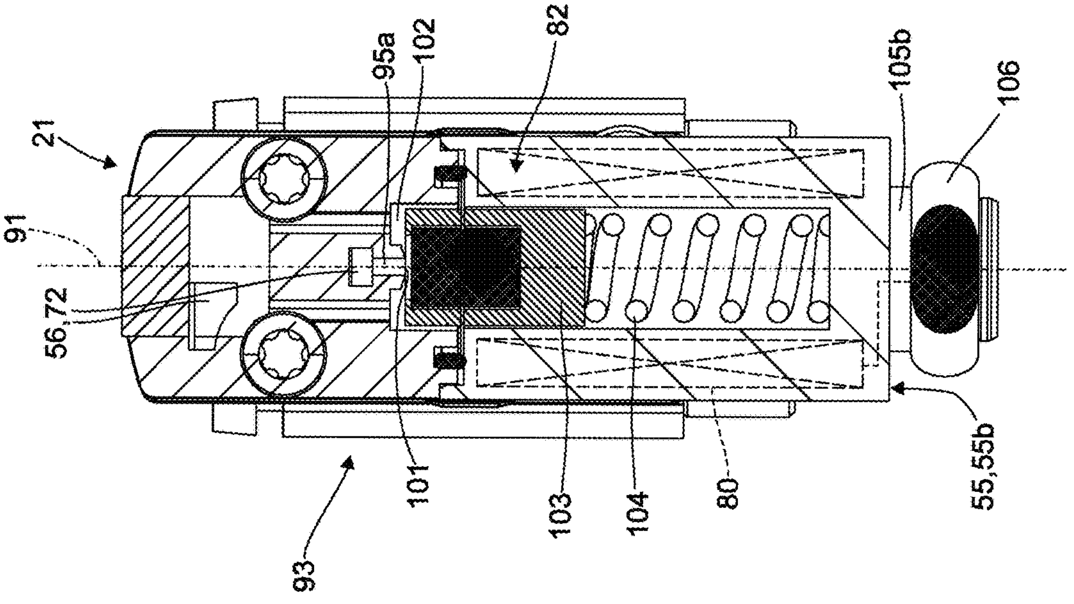
FIG. 9 shows a further cross-section of the cooling module in the area of a shut-off module according to intersection IX-IX from FIG. 7.
Figure 8:
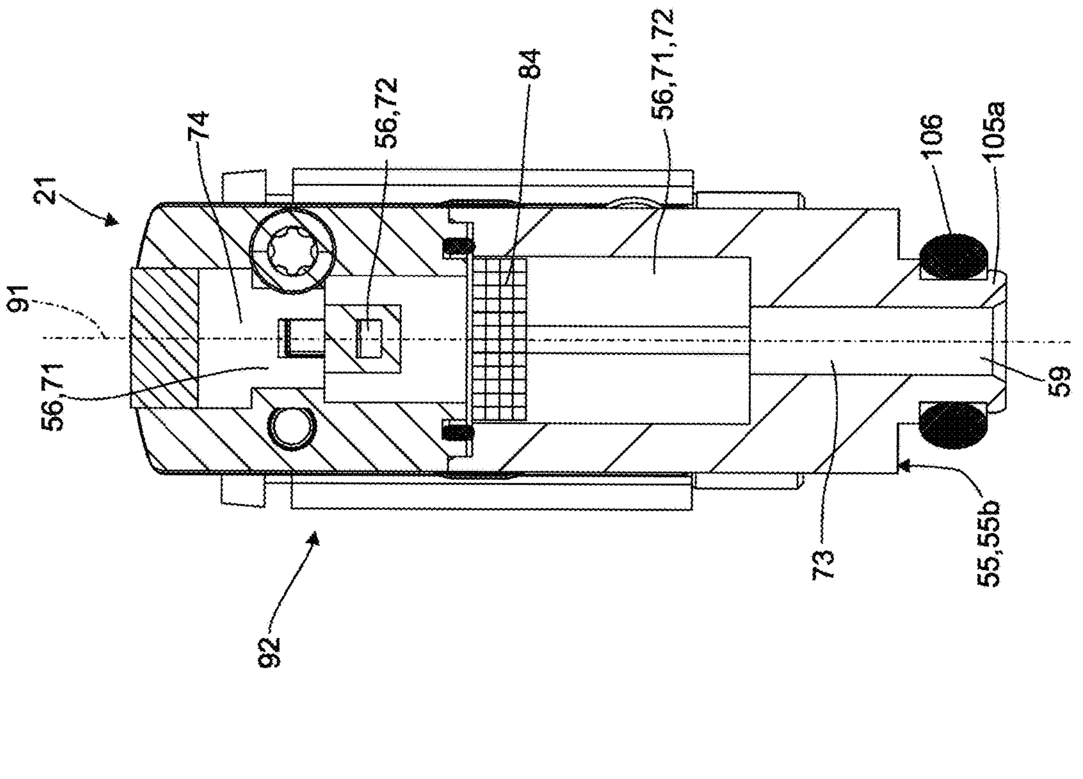
FIG. 8 shows a cross-section of the cooling module in the area of a transport module according to intersection VIII-VIII from FIG. 7.

Valve contact elements 28 of the communication string 23, located inside the communication channel 24, are allocated to each valve mounting point 18*a* which valve contact elements 28 are usefully positioned in the vertical direction 12*a* below the respective allocated valve mounting point 18*a* in the communication channel 24. The valve drive 22 of each directional valve 3 has at least one and, by way of example, two electrical contact units 30, which, with a mounted directional valve 3, are electrically in contact with one of the valve contact elements 28 of the communication string 23 through at least one wall aperture 32*a*, 32*b* designed on the allocated valve mounting point 18*a* in the channel wall 25. This is indicated in FIGS. 2 and 3. By way of example, there is a first wall aperture 32*a* and a second wall aperture 32*b*. Contact with the valve contact elements 28 takes place either directly or, according to the illustrated exemplary embodiment, via a valve contact device 31 fixed on the communication string 23. This is clearly shown in FIG. 3 in particular. In this way, the electrical valve control signals can be supplied via the communication string 23 to the valve drives 22 of the individual directional valves 3.

A plurality of fluid channels are designed in the valve support 8, which for differentiation purposes are described as valve support fluid channels 33. In the case of a plurality of these valve support fluid channels 33, fluid channels are described as collecting fluid channels 34, which extend in the valve support 8 in the principle direction 7*a* and which open out in each case with a collecting fluid channel opening 35 at each of the valve mounting points 18*a*. Depending on its type of use, each collecting fluid channel 34 enables the collective feed and discharge of the pressure medium to or from all valve mounting points 18*a*.

Beneath the collecting fluid channels 34 there exist, for example, two feed channels 36 and three vent channels 37.

One of the two feed channels 36 is a pilot feed channel 36*a*, which communicates with a pilot feed connection 38 externally accessible on the valve support 8, to which an external, for differentiation purposes also described as a pilot pressure source PV pressure source can be or is connected. One of the vent channels 37 is a pilot vent channel 37*a*, which is connected to a pilot vent connection 39 externally accessible at the valve support 8, which communicates with the atmosphere R.

The pilot feed channel 36*a* and the pilot vent channel 37*a* are used if the directional valves 3 are, according to the illustrated exemplary embodiment, of an electrofluidically piloted construction, on which a respective valve drive 22 is designed as an electrically actuable pilot valve device 42 and the directional valve 3 additionally has a main valve 43, combined with the pilot valve device 42 into an assembly, the fluidic actuation of which is provided by the allocated pilot valve device 42. Both the pilot feed channel 36*a* as well as the pilot vent channel 37*a* open out with a collecting fluid channel opening 35 at each valve mounting point 18*a* and communicate with an internal pilot valve channel, not shown here, of the pilot valve device 42 of the directional valve 3 mounted there in order to feed or discharge the required pressure medium for the piloted actuation of the main valve 43.

Each main valve 43 has a valve slide 44, indicated as a dashed line in the drawing on only one of the main valves 43, which, by means of the allocated pilot valve device 42, is movable in different switch positions by the controlled imposing of a fluid force to provide different switch states in the relevant directional valve 3.

The main valve 4 has a plurality of internal valve channels, not illustrated here, which, with the directional valve 3 mounted, open out at a valve surface 45 of the directional valve 3 and in particular of the main valve 43 with valve channel openings, likewise not illustrated here, opposite the valve mounting point 18*a* allocated to it. These valve channel openings are positioned such that they each communicate with one of the collecting fluid channel openings 35 which are present, in addition to the collecting fluid channel openings 35 of the pilot feed channel 36*a* and of the pilot vent channel. Specifically, these are collecting fluid channel openings 35 of valve support fluid channels 33, which, for differentiation purposes, are provided with the prefix "main". These valve support fluid channels 33 contain a main feed channel 36*b* and two main vent channels 37*b*, 37*c*. The main feed channel 36*b* is connected to a main feed connection 46 externally accessible at the valve support 8, to which a pressure source P can be connected and is connected when the valve arrangement 1 is in operation, which provides fluidic pressure medium, in particular compressed air, to be controlled by the directional valves 3. The pressure source P can be identical to the pilot pressure source PV. The two main vent channels 37*b*, 37*c* are connected to a main vent connection 47 externally accessible at the valve support 8, which communicates constantly with the atmosphere R.

Two further valve support fluid channels 33 also open out at each valve mounting point 18*a*, which are individual working channels 48 and not connected to each other. Each working channel 48 has a working channel opening 49 arranged at the allocated mounting point 18 and is also in fluidic connection with a working opening 52 externally accessible at the valve support 8. One of the two fluid lines 6*a*, 6*b* leading to a fluid-operated drive 5 can be connected at these two working openings 52 in each case in accordance with FIG. 1.

The valve slide 44 can be positioned by the pilot valve device 42 in at least two switch positions, in which the main feed channel 36*b*, the two main vent channels 37*b*, 37*c* and the two working channels 48 can be connected to each other in different configurations. In particular, the two working channels 48 can be connected alternately to the main feed channel 36*b* and one of the two main vent channels 37*b*, 37*c* in order to induce an alternate, opposing aeration and venting of the two drive chambers of the fluid-operated drive 5 and hence the stroke movement of its drive member 5*b*.

The pressure medium required to actuate the main valve 43 or its valve slide 44 originates from the pilot feed channel 36*a* and is led inside the allocated directional valve 3 via at least one of the mentioned pilot valve channels of the pilot valve device 42. The venting of the pilot valve device 42 takes place by using another of the mentioned pilot valve channels via the pilot vent channel 37*a*. All pilot valve devices 42 are fed via the same pilot feed channel 36*a* with the pressure medium and vented via the same pilot vent channel 37*a*, from which the name collecting fluid channel 34 results.

The pilot valve device 42 contains, by way of example, two 3/2-directional valves, which are not illustrated in further detail and which are in particular solenoid valves. As already mentioned, their electrical control takes place via the communication string 23.

The pilot feed channel 36*a* can be omitted, if the directional valves 3 are designed directly electrically actuable or, with a piloted design, the pressure medium for the pilot valve device 42 is diverted inside the main valve 43 by a valve channel connected to the main feed channel 36*b*.

The pilot vent channel 37*a* can be omitted, if the directional valves 3 are of a directly electrically actuable design or venting of the pilot valve device 42 to the atmosphere takes place directly at the directional valve 3.

The cooling module 21, already mentioned further above, is used to cool the electronic component(s) 26 of the communication string 23, wherein the fluidic pressure medium used to operate the directional valves 3 is used as a cooling medium. The cooling module 21 is able to divert fluidic pressure medium out of at least one of the collecting fluid channels 34 of the valve support 8 and feed it into communication channel 24 in order to generate a cooling flow 53, which spreads via the communication string 23 and therefore via the at least one electronic component 26 with a heat-extracting effect.

In one use position which enables the cooling function, referred to by the present description, the cooling module 21 is mounted on a cooling module mounting point 18*b* formed by one of the mounting points 18. For attachment, a plurality of fixing screws 54, by way of example, are used.

Since, according to the illustrated exemplary embodiment, the cooling module mounting point 18*b* is preferably formed from one of the valve mounting points 18*a*, its implementation form, including the fluid channel openings that are present, is consistent with that of the above-described valve mounting points 18*a*. Accordingly, the cooling module mounting point 18*b* has collecting fluid channel openings 35 from the pilot feed channel 36*a*, the pilot vent channel 37*a*, the main feed channel 36*b* and the two main vent channels 37*b*, 37*c*, as well the working channel openings 49 of two working channels 48. Moreover, two wall apertures 32*a*, 32*b* of the channel wall 25, which open into the communication channel 24, are located on the cooling module mounting point 18*b*. In view of the structure of the cooling module mounting point 18*b*, the above embodiments apply accordingly with respect to the valve mounting points 18*a*, so does not need to be repeated. The cooling module 21 has a module surface area 55 on one module underside, with which it is mounted in advance on the allocated cooling module mounting point 18*b*. The cooling module 21 is penetrated by a fluid channel arrangement designed to generate the cooling flow 53 and therefore described as a cooling channel structure 56, which consists of one or a plurality of fluid channels and which provides a fluidic connection between at least one of the collecting fluid channels 34 of the valve support 8, which opens out at the cooling module mounting point 18*b*, and the communication channel 24, so that fluidic pressure medium, in particular compressed air, can be diverted from the relevant collecting fluid channel 34 and, by executing the cooling flow 53, fed as a cooling medium into the communication channel 24 for cooling the at least one electronic component 26.

The cooling module 21 has at least one and by way of example exactly one coolant outlet opening 59, which belongs to the cooling channel structure 56 and, with the cooling module 21 mounted, opens out into the communication channel 24. Pressure medium tapped from at least one of the collecting fluid channels 34 can escape here and flow into the communication channel 24 as a cooling medium.

By way of example, of the present collecting fluid channels 34, apart from the cooling module 21, only the pilot feed channel 36*a* and the pilot vent channel 37*a* are used. The cooling channel structure 56 has two cooling channel openings 57, 58 opening out at the module surface area 55, which, for differentiation purposes, are described as a vent cooling channel opening 57 and as a feed cooling channel opening 58 and which can be or are fluidically connected via the cooling channel structure 56 to the coolant outlet opening 59. The vent cooling channel opening 57 lies opposite the collecting fluid channel opening 35 of the pilot vent channel 37*a* and the feed cooling channel opening 58 opposite the collecting fluid channel opening 35 of the pilot feed channel 36*a*. A seal structure 61 inserted between the module surface area 55 and the mounting surface 13 enables fluid to pass over, on the one hand, between the pilot vent channel 37*a* and the vent cooling channel opening 57 and, on the other hand, between the pilot feed channel 36*a* and the feed cooling channel opening 58 without leaking.

All other fluid channel openings present on the cooling module mounting point 18*b*, which are not used for the cooling function of the cooling module 21—for example the collecting fluid channel openings 35 of the main feed channel 36*b* and the two main vent channels 37*b*, 37*c* as well as the working channel openings 49 of the two working channels 48—are impermeably sealed by the cooling module 21, in particular through the action of the seal structure 61, where present. The cooling module 21 has a cover section 62 in the area of its module surface area 55, which conceals the aforesaid fluid channel openings. The working channel openings 49 do not need to be concealed by the cover section 62, as they have no function here and do not contain any pressure medium.

Thus by way of example, only fluidic pressure medium is used for the cooling function of the cooling module 21, which, when the valve arrangement 1 is in operation, waits or flows in the pilot vent channel 37*a*, conceived as a collecting fluid channel 34, and in the pilot feed channel 36*a* likewise conceived as a collecting fluid channel 34.

Possible exemplary embodiments of the invention, in which the cooling medium is diverted from the main feed channel 36*b* and/or from at least one of the main vent channels 37*b*, 37*c*, are not illustrated in the drawings. This is particularly the case if neither a pilot feed channel or a pilot vent channel 37*b*, which is used for operation of the valve assembly 2, is present.

To extract heat effectively from the communication channel 24, at least one outlet channel 63 is usefully designed in the valve assembly 2, which provides a free fluid connection between the communication channel 24 and the atmosphere surrounding the valve assembly 2. After the cooling function has taken place, the cooling medium can escape from the communication channel 24 to the atmosphere through the outlet channel 63 according to den arrow representations in FIGS. 1, 3 and 12.

To prevent impurities from entering from outside through the at least one outlet channel 63 into the communication channel 24, it is advantageous if the outlet channel 63 is provided with a filter 64, which, for example, consists of a fine-pored sintering material. The filter 64 can be a compact filter element, which is installed in the outlet channel 63 to save space. Alternatively, a membrane can be installed as a filter 64, which is permeable to gases, however not to liquids and solids.

Preferably at least one outlet channel 63 is designed in the aforesaid outlet module 111. This offers the advantageous possibility of realising an outlet channel 63, without having to design any additional fluid channel structures at the valve support 8. For differentiation purposes, the outlet channel 63 of the outlet module 111 is also described in the following as a module outlet channel 63*a*. The outlet module 111 is mounted in its use position to a outlet module mounting point 18*c* formed from one of the mounting points 18. For attachment, a plurality of fixing screws 113, by way of example, are used.

Since, according to the illustrated exemplary embodiment, the outlet module mounting point 18*c* is preferably formed from one of the valve mounting points 18*a*, its implementation form, including the fluid channel openings that are present, is consistent with that of the above-described valve mounting points 18*a*. Correspondingly, the outlet module mounting point 18*c* has—see FIG. 12—collecting fluid channel openings 35 from the pilot feed channel 36*a*, the pilot vent channel 37*a*, the main feed channel 36*b* and the two main vent channels 37*b*, 37*c*, as well as the working channel openings 49 of two working channels 48. Moreover, two wall apertures 32*a*, 32*b* of the channel wall 25, which open into the communication channel 24, are located on the outlet module mounting point 18*c*, which when mounted with a directional valve 3, are used for making its electrical contact with the communication string 23. In view of the structure of the outlet module mounting point 18*c*, the above embodiments apply accordingly with respect to the valve mounting points 18*a*, so does not need to be repeated.

The outlet module 111 has a module surface area 114 on one module underside, with which it is mounted in advance on the allocated outlet module mounting point 18*c* in the use position.

The outlet module 111 is penetrated by the mentioned module outlet channel 63*a*. The module outlet channel 63*a* has at least one inlet opening 112 on the module surface area 114 and at least one outlet opening 115 on a module outer surface, which is not covered in the mounted state of the outlet module 111, by way of example on a top module outer surface 116 located on a module topside of the outlet module opposite the module surface area 114. For example, an outlet opening 115 can also be arranged on one of the two front-facing module outer surfaces.

By way of example, the module outlet channel 63*a* has exactly one inlet opening 112 and exactly one outlet opening 115.

Figure 12:
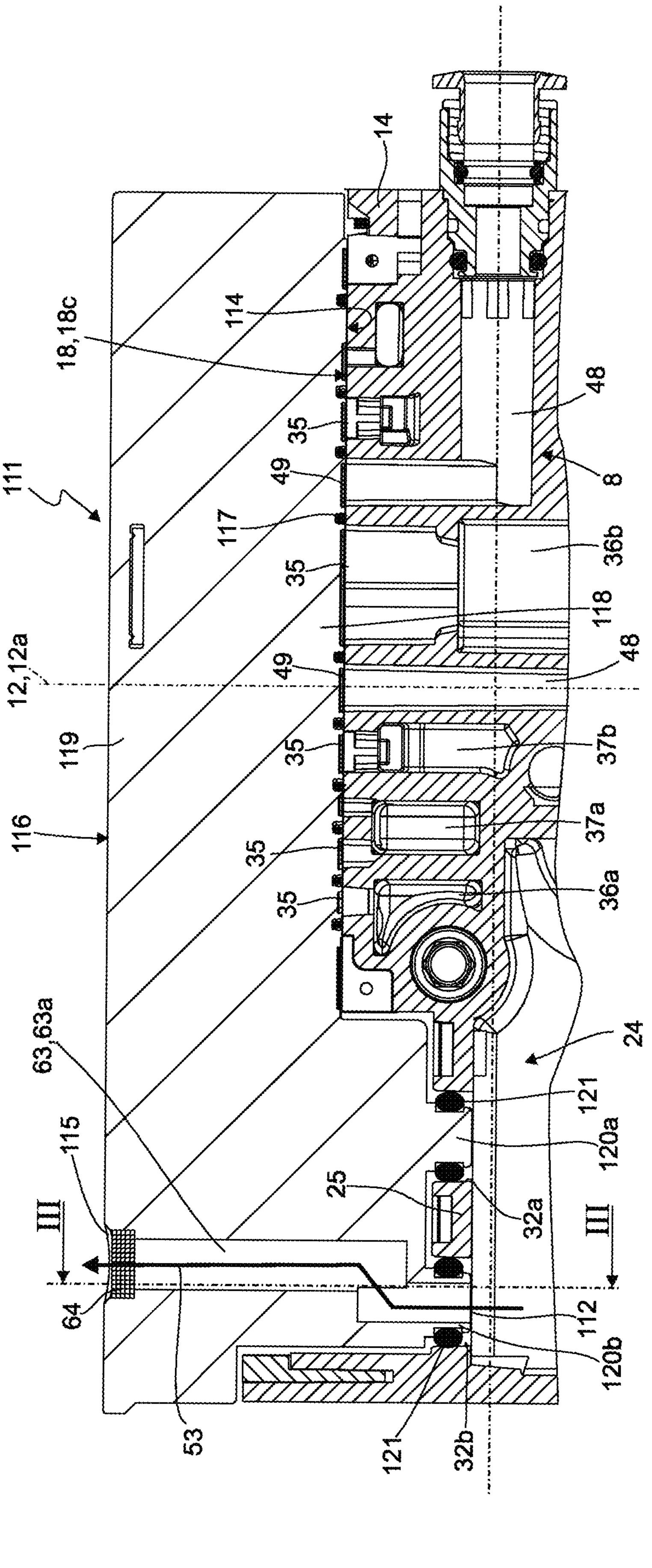
FIG. 12 shows a cross-section of the valve assembly according to intersection XII-XII from FIGS. 3 and 11 in the area of a mounted outlet module.

The at least one inlet opening 112 is positioned on the module surface area 114, such that, with the outlet module 111 mounted in the use position, it is in fluidic connection with the communication channel 24, to enable the cooling medium to enter in accordance with the arrow representation in FIG. 12.

The fluid channel openings of the valve support 8 present on the outlet module mounting point 18*c* are not used for the cooling medium outlet function of the outlet module 111.

They are therefore impermeably sealed by the outlet module 111, in particular through the action of a seal structure 117 inserted between the module surface area 114 and the mounting surface 13. The outlet module 111 has a cover section 118 in the area of its module surface area 114, which covers the aforesaid fluid channel openings. The working channel openings 49 do not need to be concealed by the cover section 118, as they have no function here and do not contain any pressure medium.

Figure 10:
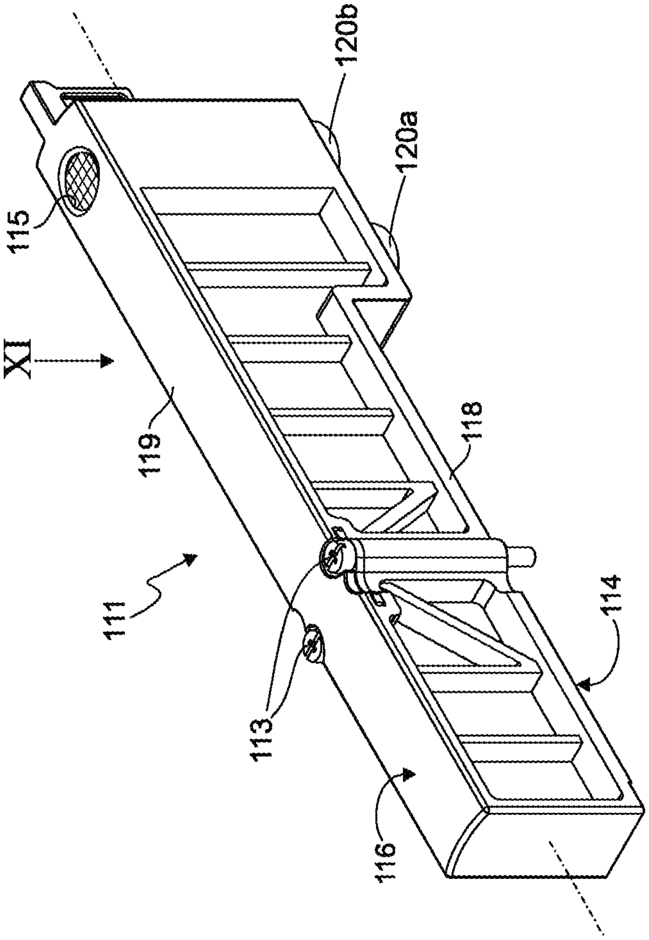
FIG. 10 shows an individual representation of an outlet module belonging to the valve assembly of FIGS. 1 to 9 in an isometric representation.
Figure 11:
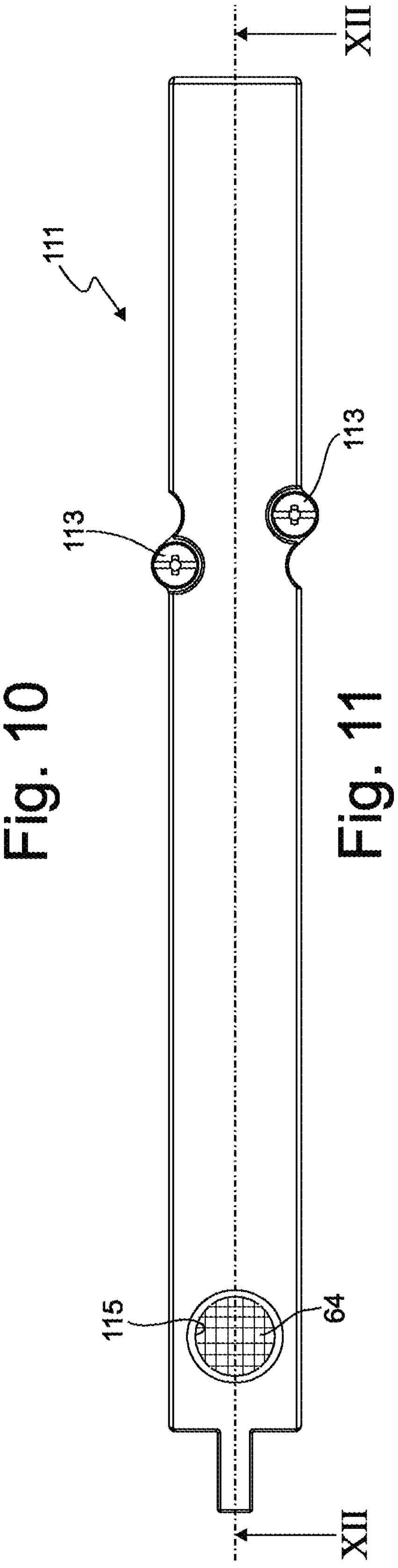
FIG. 11 shows a plan view of the outlet module with line of sight according to arrow XI from FIG. 10.

The outlet module 111 usefully consists—except for a filter 64 optionally installed in the module outlet channel 63*a*—of a one-piece block body 119, which forms the cover section 118, is penetrated by the module outlet channel 63*a* and has both the module surface area 114 as well as the top module outer surface 116. It consists in particular of plastic and can have thin areas on the side to save on material, as can be seen in FIG. 10.

The outlet module 111 has on the module surface area 114 preferably two cylindrically-shaped module projections 120*a*, 120*b*, which, with the outlet module 111 mounted, each immerse into one of the two wall apertures 32*a*, 32*b* of the channel wall 25 designed on the outlet module mounting point 18*c* in the valve support 8, wherein they each usefully hold a seal 121, which interacts with the channel wall 25, so that the allocated wall aperture 32, 32*b* is sealed closed.

The inlet opening 112 is usefully located at the front on one of the two module projections 120*a*, 120*b* and therefore, with the outlet module 111 mounted, opens directly into the communication channel 24. By way of example, it is located at the external module projection 120*b*, which immerses into the second wall aperture 32*b*. The second of the two module projections 120*a*, 120*b* is closed and consists in particular of solid material. Optionally, the module outlet channel 63*a* can branch out inside the outlet module 111 and open out at both module projections 120*a*, 120*b* with an inlet opening 112 in each case. With respect to the row of mounting points 18 extending in the principle direction 7*a* inside the valve assembly 2, it is advantageous if a first in the row of mounting points 18 is mounted with a cooling module 21 and a last in the row of mounting points 18 with an outlet module 111, so that in this way the cooling flow 53 can flow through the communication channel 24 over at least almost its entire length.

When the valve arrangement 1 is in use, the pilot vent channel 37*a* normally communicates directly with the atmosphere via the pilot vent connection 39 arranged on the valve support 8. If the cooling medium is tapped from the pilot vent channel 37*a* in accordance with the illustrated exemplary embodiment, it is useful however to close the pilot vent connection 39, so the entire used pilot air is available as a cooling medium for feeding into the communication channel 24. Here, the valve arrangement 1 usefully has a closing element 122, designed, for example, as a sealing plug and illustrated in FIG. 1, which can be inserted into the pilot vent connection 39 and fixed there in order to close it. The venting of the pilot valve devices 42 then takes place through the communication channel 24 with simultaneous cooling effect.

According to an alternative embodiment for realising an outlet channel 63, an outlet channel 63 is designed in the valve support 8, illustrated as a dot-dash line in FIGS. 1, 3, 4 and 5, and for differentiation purposes is therefore also described as a valve support outlet channel 63*b*. By way of example, such a valve support outlet channel 63*b* is inserted in the form of a wall aperture in a front-facing channel wall section 25*a* of the channel wall 25, which by way of example is a constituent part of the second terminating module 16. Usefully in this case, the valve assembly 2 does not contain an outlet module 111.

It is clear that the valve support outlet channel 63*b* can also be placed elsewhere in the valve support. For example, at least one of the wall apertures 32*a*, 32*b* present on the mounting points 18 can be used as a valve support outlet channel 63*b* without an allocated outlet module 111, simply by remaining unclosed. For example, a closing plate can be mounted on one of the mounting points 18, which closes all fluid channel openings present on the mounting point, but does not close at least one of the two wall apertures 32*a*, 32*b*.

A plurality of outlet channels 63 opening at different places into the communication channel 24 can readily be present.

It is possible to equip the same valve support with at least one valve support outlet channel 63*b* and additionally with at least one module outlet channel 63*a*, as outlet channels 63.

Furthermore, it is possible to design at least one outlet channel 63 as a combination of a valve support outlet channel 63*b* and a module outlet channel 63*a*. Here, a release module 111 can be mounted so that its module outlet channel 63*a* is connected to a valve support outlet channel 63*b*.

The feed connections 38, 46 and the vent connections 39, 47 are by way of example equipped with connection devices, to each of which a fluid line, not illustrated here, can be releasably connected, which, in the case of the feed connections 38, 46, leads to the pressure source PV or P and which, in the case of the vent connections 39, 47, enables a contained discharge of the used pressure medium or used air. Alternatively, the vent connections 39, 47 can also be designed for direct ventilation into the atmosphere and/or mounted with a sound damper.

For example, the pilot feed connection 38 and the pilot vent connection 39 are located on the second terminating module 16, while the main feed connection 46 and the main vent connection 47 are arranged on the first terminating module 15. The latter is preferably designed multi-piece and divided into an end unit 15*a* and an intermediate unit 15*b* positioned between the end unit 15*a* and the carrier 14, wherein the main feed connection 46 and the main vent section 47 are located on the intermediate unit 15*b* and the end unit 15*a* is equipped with the electromechanical interface unit 17.

The valve support 8 has at least in the area of the carrier 14 a fluid channel section 65 penetrated by the valve support fluid channels 33 and a communication channel section 66 arranged next to it lengthways and penetrated by the communication channel 24. The fluid channel section 65 and the communication channel section 66 lie next to each other in a transverse direction 67*a* of the valve support 8, where the transverse direction 67*a* is the axial direction of a transverse axis 67 of the valve support 8, which is aligned vertically to the main axis 7 and to the vertical axis 12.

The mounting surface 13 is assembled from a first surface section 13*a*, which is designed on the fluid channel section 65, and a second surface section 13*b*, which connects to it in the transverse direction 67*a* and which is designed on the communication channel section 66. The collecting fluid channel openings 35 and the working channel openings 49 are located on the first surface section 13*a*, while the wall apertures 32*a*, 32*b* on the one hand open into the communication channel 24 and on the other hand open out at the second surface section 13*b* of the mounting surface 13. The aforesaid wall apertures 32*a*, 32*b* are located, as mentioned, not only at each valve mounting point 18*a*, but also at each cooling module mounting point 18*b*. With the cooling module 21 mounted, the coolant outlet opening 59 will, by way of example, lie in the area of the first wall aperture 32*a* of the two wall apertures 32*a*, 32*b*, so that the cooling medium can enter from the cooling module 21 through the first wall aperture 32*a* into the communication channel 24.

Preferably the allocated channel openings 35, 49 and wall apertures 32*a*, 32*b* are arranged successively in the transverse direction 67*a* at each mounting point 18.

The mounting surface 13 is located, by way of example, on a top side of the valve support 8 and faces away in the vertical direction 12*a* from a lower external surface 68 of the valve support 8. By way of example, the mounting surface 13 is tiered, wherein its first surface section 13*a* is at a greater distance from the lower external surface 68 than its second surface section 13*b*. Alternatively, the mounting surface 13 can also lie entirely in the same plane.

In accordance with the illustrated exemplary embodiment, the cooling channel structure 56 preferably contains two cooling channels 71, 72, which, for differentiation purposes when referenced individually, are described as a vent cooling channel 71 and a feed cooling channel 72. Both cooling channels 71, 72 penetrate the cooling module 21. The vent cooling channel 71 connects the coolant outlet opening 59 to the vent cooling channel opening 57 and, with a mounted cooling module 21, communicates therefore on the input side with the pilot vent channel 37*a*. The feed cooling channel 72 connects the coolant outlet opening 59 to the feed cooling channel opening 58 and, with a mounted cooling module 21, communicates therefore with the pilot feed channel 36*a*.

The vent cooling channel 71 and the feed cooling channel 72 can connect the vent cooling channel opening 57 and the feed cooling channel opening 58 to the coolant outlet opening 59 independently of each other in a fluidic parallel connection.

By way of example, the two cooling channels 71, 72 join together within the cooling module 21 in a joining area 74, which is set apart from the coolant outlet opening 59, so that they have a joint outlet channel section 73 extending between the joining area 74 and the coolant outlet opening 59. Alternatively, they can also be designed separate from each other and each have their own coolant outlet opening 59.

The vent cooling channel 71 offers a permanent fluidic connection between the vent cooling channel opening 57 and the coolant outlet opening 59, subject to, by way of example, the adoption of an open position of a check valve 75 inserted along its route. The check valve 75, understood as optional, works independently from the pending pressure difference between the vent cooling channel opening 57 and the coolant outlet opening 59, wherein it only permits fluid to pass, if the fluid pending pressure at the vent cooling channel opening 57 is at least slightly greater than the pending fluid pressure at the coolant outlet opening 59, which results in the formation of a cooling flow 53. With pressure equilibrium or with greater fluid pressure at the coolant outlet opening 59 compared to the vent cooling channel opening 57, a fluid flow through the vent cooling channel 71 is prevented by the check valve 75, which in particular precludes unwanted pressure medium from flowing into the pilot vent channel 37*a* from the communication channel 24 or from the feed cooling channel 72. The latter could otherwise happen in the absence of a check valve 75 in particular, if an additional cooling flow 53 is connected via the feed cooling channel 72.

For example, the check valve 75 contains a movable check valve member 76, which is pretensioned in a closed position by a spring 77. The spring 77 is moreover supported on an embedded ball 78.

During operation of the valve arrangement 1, a cooling flow 53, which flows through the vent cooling channel 71, is always automatically initiated, if a higher fluid pressure develops in the pilot vent channel 37*a* compared to the prevailing pressure in the communication channel 24, which is regularly the case, if one of the pilot valve devices 42 of the directional valves 3 has switched to venting and releases pressure medium into the pilot vent channel 37*a*. Based on the present number of directional valves 3 and their generally asynchronous actuation, with usual operation of the valve arrangement 1, a potentially pulsating, equally quasi continuous cooling flow 53 through the vent cooling channel 71 must for the most part be expected.

In an exemplary embodiment, not illustrated here, the vent cooling channel 71 does not contain a check valve 75, so that, independent of the prevailing pressure conditions, an open fluidic connection between the pilot vent channel 37*a* and the communication channel 24 through the vent cooling channel 71 is preferred.

The feed cooling channel 72 is preferably designed to generate a cooling flow 53, controlled and independent of pressure. It enables in particular a cooling flow 53 tapped from the pilot feed channel 36*a* to be switched on and off independent of temperature. The temperature used for temperature-independent control is a prevailing temperature in the communication channel 24, where, for example, it can be the media temperature of the medium surrounding the communication string 23 and/or a temperature of a component of the communication string 23 and in particular of an electronic component 26. To capture the temperature used for controlling the cooling flow 53, at least one temperature sensor 81, which is able to emit temperature-dependent electrical temperature signals, is located, by way of example, inside the communication channel 24.

Preferably the temperature sensor 81 is, in accordance with the illustrated exemplary embodiment, a direct constituent part of, for example, an electronic component 26 of the communication string 23, formed by a processor. Not illustrated is an embodiment, in which at least one temperature sensor 81 separated from the at least one electronic component 26 to be cooled is present. Such a separate temperature sensor 81 is however equally preferably a constituent part of the communication string 23.

The electronic control device 4, by way of example, takes over the control for switching the cooling flow 53 on and off in the feed cooling channel 72. It receives the electrical temperature signals of the temperature sensor 81 via the communication string 23 and, depending on these electrical temperature signals—likewise via the communication string 23—transmits electrical valve control signals to a electrically actuable shut-off valve 82, which is a constituent part of the cooling module 21 and which is activated along the route of the feed cooling channel 72.

The electrically actuable shut-off valve 82 has an electrically-operated actuating device 80, which responds to the valve control signals. Preferably the shut-off valve 82 is a solenoid valve with an electromagnet as actuating device 80. This is the case in the example.

By means of the shut-off valve 82, the feed cooling channel 72 can be optionally closed to prevent fluid from entering or released to enable fluid to enter. In this respect, the shut-off valve 82 can either adopt a closed position or an open position.

It is preferred that the shut-off valve 82 has a 2/2-way valve function, wherein it is usefully of the "Normally closed" type. Its switch status can therefore be set by either applying or not applying a control voltage on the actuating device 80, which can be generated by the electronic control device 4, wherein the applied or not applied control voltage forms the valve control signals. With control voltage is not applied, the shut-off valve 82 is set in the closed position and, with control voltage applied, in the open position.

Preferably the electronic control device 4 is designed insofar as to induce the closed position of the shut-off valve 82, if the temperature detected by the temperature sensor 81 is below a pre-set temperature threshold, and also induce the open position of the shut-off valve 82, if the detected temperature has reached or exceeded the pre-set temperature threshold. The temperature threshold is usefully fixed or can also be variably adjusted based on experience values. The aforesaid temperature management can also readily be realised independently of the electronic control device 4 by means of control electronics, which is implemented by at least one electronic component 26 of the communication string 23.

The electrical contact of the shut-off valve 82 with the communication string 23 is usefully made through the second wall aperture 32*b*, and in particular, in the same way as electrical contact of the valve drives 22 or the pilot valve devices 42 is made for the directional valves 3. Hence, in the area of the module surface area 55, the cooling module 21 has an electrical contact unit 83, designed comparable to a contact unit 30 of the directional valves 22, which makes a contact with cooling module contact elements 28*a* of the communication string 23 via a cooling module contact device 31*a* fixed on the communication string 23. By way of example, the cooling module contact device 31*a* is formed from a valve contact device 31, while the cooling module contact elements 28*a* are formed from valve contact elements 28. In this way, the contact steps used for the directional valves 3 can also be used cost-effectively unchanged for the electrical contact of the shut-off valve 82 of the cooling module 21.

Usefully, the cooling module 21 is equipped with a filter 84, conceived in particular as an air filter, which is used for filtering the cooling medium, which, for example, is built into the outlet channel section 73 of the cooling channel structure 56 and therefore allocated both to the vent cooling channel 71 as well as the feed cooling channel 72. The filter 84 prevents contamination of the communication channel 24 by impurities, which the pressure medium tapped from the valve support 8 for cooling may bring with it.

In particular, if the vent cooling channel 71 and the feed cooling channel 72 are designed completely separate from each other, each of these two cooling channels 71, 72 can contain its own filter 84.

The filter 84 is realised, in particular as a compact filter element, which is inserted in the relevant cooling channel 71 or 72. In this way, the installed filter element 84 does not impact the external dimensions of the cooling module 21.

The cooling module 21 is, according to the illustrated exemplary embodiment, preferably assembled from a plurality of functional units combined into an assembly. These functional units comprise a tapping unit 85 responsible for tapping the cooling medium from the valve support 8 and an intake unit 86 responsible for feeding the cooling medium into the communication channel 24. The cooling module 21 has a longitudinal axis 87, wherein the intake unit 86 is placed in the axial direction of this longitudinal axis 87 on a front face 88 of the tapping unit 85. Attachment steps used for fixing, for example a screw connection or locking connection, are not shown in the drawings.

The cooling module 21 is mounted on the cooling module mounting point 18*b* so that its longitudinal axis 87 is aligned parallel to the transverse axis 67. In this way, the tapping unit 85 extends along the first surface section 13*a* and the intake unit 86 along the second surface section 13*b* of the mounting surface 13. The module surface area 55 of the cooling module 21 has a first surface section 55*a* designed on the tapping unit 85, facing the first surface section 13*a* of the mounting surface 13, and a second surface section 55*b* designed on the intake unit 86, facing the second surface section 13*b* of the mounting surface 13. These two surface sections 55*a*, 55*b* are offset from each other in the axial direction of a vertical axis 91 of the cooling module 21, which is orthogonal to the longitudinal axis 87 and, with the cooling module 21 mounted, parallel to the vertical axis 12, so that the module surface area 55 is tiered in accordance with the mounting surface 13.

The intake unit 86 has preferably a modular structure and contains, by way of example, a transport module 92 positioned on the front face 88 of the tapping unit 85 and a shut-off module 93 positioned on the transport module 92 in a joining area 94 on the front side opposite the tapping unit 85. The shut-off module has the shut-off valve 82, described already, or formed from this.

The vent cooling channel opening 57 and the feed cooling channel opening 58 are both located on the tapping unit 85, so that both cooling channels 71, 72 penetrate the tapping unit 85. The cooling channel openings 57, 58 are located, by way of example, on the first surface section 55*a* of the module surface area 55. The vent cooling channel 71 has a first channel section 71*a* running in the tapping unit 85, which, just like a first channel section 72*a* of the feed cooling channel 72 running in the tapping unit 85, opens out at the front face 88 of the tapping unit 85.

The check valve 75 is usefully integrated in the tapping unit 85. The latter usefully contains a one- or multi-piece block body 89, which forms the cover section 62, the first surface section 55*a* of the module surface area 55 and is penetrated by the first channel sections 71*a*, 72*a* if the two cooling channels 71, 72.

The vent cooling channel 71 continues with a second channel section 71*b* inside the transport module 92, wherein, at one end in the area of the front face 88 of the tapping unit 85, it communicates with the first channel section 71*a* and, at the other end, ends with the coolant outlet opening 59*a*. Thus, inside the intake unit 86, the vent cooling channel 71 extends exclusively inside the transport module 92.

The feed cooling channel 72 continues with a second channel section 72*b* inside the intake unit 86, where, at one end in the area of the front face 88 of the tapping unit 85, it communicates with the first channel section 72*a* of the feed cooling channel 72. With its opposite end, the second channel section 72*b* likewise opens out via the coolant outlet opening 59 into the communication channel 24.

Inside the intake unit 86, the second channel section 72*b* of the feed cooling channel 72 has an input section 95*a* and a connecting output section 95*b*. The input section 95*a* which communicates with the first channel section 72*a* penetrates the transport module 92 and in the joining area 94 passes over into the shut-off module 93, where it ends with a control opening 101, which opens into a valve chamber 102 of the shut-off valve 82. The output section 95*b* connects this valve chamber 102 to the coolant outlet opening 59, wherein it extends partly in the shut-off module 93 and partly in the transport module 92 and therefore penetrates the joining area 94.

A valve member 103 of the shut-off valve 82 is located in the valve chamber 102, which is pretensioned in a closed position by a spring 104, in which it closes the control opening 101 and consequently normally closes the feed cooling channel 72. By electrically actuating the shut-off valve 82 in the manner already explained above by supplying an electrical valve control signal, the valve member 103 can be raised from the control opening 101, so that the input section 95*a* and the output section 95*b* are connected to each other through the valve chamber 102 and the cooling medium can flow through.

The joint outlet channel section 73 of the vent cooling channel 71 and feed cooling channel 72 is formed from the end sections of the second channel sections 71*b*, 72*b* the vent cooling channel 71 and the feed cooling channel 72, extending in the transport module 92.

The transport module 92 and the shut-off module 93 each have, in the area of the second surface section 55*b* of the module surface area 55, one of two fixing supports 105*a*, 105*b*, which, with the cooling module 21 mounted, each immerse into one of the two wall apertures 32*a*, 32*b*, wherein they each usefully hold a seal 106, which interacts with the channel wall 25, so that the allocated wall aperture 32*a*, 32*b* is sealed closed.

The coolant outlet opening 59 is usefully located at the front on the fixing support 105*a* of the transport module 92. The electrical contact unit 83 of the shut-off valve 82 is usefully arranged on the fixing support 105*b* of the shut-off module 93. The latter offers the advantageous possibility of electrically controlling the shut-off valve 82 via a switch output present as standard on the communication string 23 for electrical control of the valve drives 22, which is formed by at least one of the valve contact elements 28 and functions as a cooling module contact element 28*a*.

As an alternative to an electrically controllable shut-off valve 82, a design of a shut-off valve 82, which is actuable via a form memory alloy or a bimetal by the prevailing temperature in the communication channel 24, is recommended.

The invention claimed is:

1. A valve arrangement, comprising:

a valve assembly, which has a valve support extending in a principle direction along a main axis and a plurality of electrically actuable directional valves, wherein the valve support has a mounting surface with a plurality of mounting points arranged successively in the principle direction, of which at least a plurality are designed as valve mounting points, on each of which one of the directional valves is mountable, wherein a plurality of valve support fluid channels, through which a fluidic pressure medium can flow, are designed in the valve support, which are at least in part collecting fluid channels extending in the principle direction, and open out at each valve mounting point and are fluidly connected to the directional valves mounted on the valve mounting points, and wherein a communication channel is designed in the valve support extending in the principle direction, in which an electrical communication string is arranged, having at least one electronic component and is connectable to an electronic control device, with which the mounted directional valves in the area of the valve mounting point allocated to each of them have an electrical contact, wherein at least one of the mounting points of the valve supports is designed as a cooling module mounting point, on which a cooling module of the valve arrangement, penetrated by a cooling channel structure, is mountable, wherein by means of the cooling channel structure of the mounted cooling module, a fluidic connection between at least one collecting fluid channel of the valve support fluid channels, opening out at the cooling module mounting point, and the communication channel is providable, through which fluidic pressure medium diverted from the collecting fluid channel is feedable into the communication channel by executing a cooling flow as a cooling medium for cooling the at least one electronic component of the electrical communication string.

2. The valve arrangement according to claim 1, wherein the cooling module has a module surface area facing, in the mounted state, the assigned cooling module mounting point, at which surface area the cooling channel structure opens out.

3. The valve arrangement according to claim 1, wherein a collecting fluid channel of the valve support fluid channels which opens out to the cooling module mounting point and is fluidly connected to the cooling channel structure of the mounted cooling module is a vent channel used for venting purposes.

4. The valve arrangement according to claim 3, wherein the electrically actuable directional valves are at least partly of an electrofluidically piloted design, wherein the electrically actuable directional valves have a main valve and an electrically actuable pilot valve device used to actuate the main valve, wherein the pilot valve device is in electrical contact with the communication string and wherein the vent channel of the valve support, which is designed as a collecting fluid channel and connected fluidically to the cooling channel structure of the mounted cooling module, is a pilot vent channel provided for venting the pilot valve devices.

5. The valve arrangement according to claim 3, wherein the cooling channel structure of the cooling module has a vent cooling channel, which communicates with the vent channel of the valve support and, opens into the communication channel.

6. The valve arrangement according to claim 5, wherein the vent cooling channel is a free-flowing fluid channel dependent on the differential pressures of the cooling medium, such that the cooling medium automatically starts flowing if a higher pressure is reached in the vent channel of the valve support than in the communication channel.

7. The valve arrangement according to claim 5, wherein a check valve is activated in the vent cooling channel, which prevents a flow of fluid through the cooling module into the vent channel of the valve support and permits a flow of fluid in the opposite direction.

8. The valve arrangement according to claim 5, wherein a gas-permeable filter is arranged in the vent cooling channel.

9. The valve arrangement according to claim 1, wherein a collecting fluid channel of the valve support fluid channels which opens out to the cooling module mounting point and is fluidly connected to the cooling channel structure of the mounted cooling module is a feed channel which supplies the electrically actuable directional valves with fluid pressure medium and for this purpose is connected or connectable to an external pressure source, wherein the pressure source is a compressed air source.

10. The valve arrangement according to claim 9, wherein the electrically actuable directional valves are at least partly of an electrofluidically piloted design, wherein the electrically actuable directional valves have a main valve and an electrically actuable pilot valve device used to actuate the main valve, wherein the pilot valve device is in electrical contact with the communication string and wherein the feed channel of the valve support fluid channels, which is designed as a collecting fluid channel and connected fluidically to the cooling channel structure of the mounted cooling module, is a pilot feed channel provided for supplying fluid to the pilot valve devices.

11. The valve arrangement according to claim 9, wherein the cooling channel structure of the cooling module has a feed cooling channel, which, in the mounted state of the cooling module, communicates with the feed channel of the valve support and opens into the communication channel and during the process of which a temperature-dependent, controllable shut-off valve is activated, which enables an either controlled closing or opening of the feed cooling channel and that has a 2/2-way valve function.

12. The valve arrangement according to claim 11, wherein in order to control the shut-off valve it is designed electrically actuable, wherein, with the cooling module mounted, it is in electrical contact with the communication string, so that it is electrically actuable by means of the electrical control signals, which is suppliable by means of the communication string.

13. The valve arrangement according to claim 12, wherein at least one temperature sensor is arranged in the communication channel, which is realised as a constituent part of the communication string and which is designed for emitting electrical temperature signals, which electrical temperature signals are utilizable with the electrical actuation of the shut-off valve.

14. The valve arrangement according to claim 11, wherein a gas-permeable filter is arranged in the feed cooling channel.

15. The valve arrangement according to claim 11, wherein the cooling module has a tapping unit, which is penetrated by both a vent cooling channel as well as the feed cooling channel and which taps the fluidic pressure medium acting as a cooling medium from the valve support, and an intake unit, which is attached to the tapping unit and which feeds the cooling medium into the communication channel, wherein the intake unit has a shut-off module, having the shut-off valve, and a transport module positioned between the shut-off module and the tapping unit, wherein the vent cooling channel inside the intake unit penetrates exclusively the transport module and the feed cooling channel inside the intake unit penetrates both the transport module as well as the shut-off module, wherein the vent cooling channel and the feed cooling channel, with the cooling module mounted, open out into the communication channel via a joint coolant outlet opening designed on the transport module.

16. The valve arrangement according to claim 15, wherein a gas-permeable filter is arranged in a joint outlet channel section of the vent cooling channel and the feed cooling channel, which ends with the joint coolant outlet opening.

17. The valve arrangement according to claim 1, wherein the cooling module mounting point mounted with a cooling module is formed from one of the valve mounting points suitable for mounting with one of the electrically actuable directional valves, wherein any valve mounting point is usable as a cooling module mounting point.

18. The valve arrangement according to claim 17, wherein at least one of the valve support fluid channels is designed as an individual working channel that opens out at each valve mounting point, which is fluidically connected to the electrically actuable directional valve mounted on the relevant valve mounting point and which each lead to a working opening accessible externally at the valve support, to which a fluid-operated drive, controllable through the allocated directional valve, is connectable.

19. The valve arrangement according to claim 17, wherein the cooling module has a cover section, by which, with the cooling module mounted, valve support fluid channels, which open out at the valve mounting point used as a cooling module mounting point and which do not communicate with the cooling channel structure, are concealed.

20. The valve arrangement according to claim 1, wherein the communication channel is delimited all the way round by a channel wall which is designed as a constituent part of the valve support, wherein at least one outlet channel, which connects the communication channel to the atmosphere and which permits the cooling medium to exit to the atmosphere, is present, which is provided with a gas-permeable filter.

21. The valve arrangement according to claim 20, wherein at least one outlet channel is designed in the valve support, in the form of a wall aperture of the channel wall of the communication channel.

22. The valve arrangement according to claim 1, wherein at least one of the mounting points of the valve support is designed as an outlet module mounting point, on which an outlet module of the valve assembly is mountable, which, in the mounted state of the outlet module, is penetrated by an outlet channel connected to the communication channel, which communicates with the communication channel via at least one inlet opening located on the outlet module and with the atmosphere via at least one outlet opening located on the outlet module.

23. The valve arrangement according to claim 22, wherein at least one inlet opening is located at the front on one of two module projections of the outlet module, which, with the outlet module mounted on the allocated outlet module mounting point, each immerse into a wall aperture opening into the communication channel.

24. The valve arrangement according to claim 23, wherein the outlet module mounting point mounted with the outlet module is formed from one of the valve mounting points suitable for mounting with one of the electrically actuable directional valves, wherein any valve mounting point is usable as an outlet module mounting point.

25. The valve arrangement according to claim 1, wherein the valve support has a carrier having the mounting surface and penetrated by the communication channel, which is segmented in the principle direction, in that it has a plurality of adjoined carrier segments, on which in each case at least one of the mounting points is designed.

26. The valve arrangement according to claim 1, wherein the communication string contains a circuit board arrangement mounted with the at least one electronic component to be cooled.

* * * * *